(12) United States Patent
Doufas et al.

(10) Patent No.: US 11,302,459 B2
(45) Date of Patent: Apr. 12, 2022

(54) POLYETHYLENE EXTRUDATES AND METHODS OF MAKING THE SAME

(71) Applicant: ExxonMobil Chemical Patents Inc., Baytown, TX (US)

(72) Inventors: Antonios K. Doufas, Houston, TX (US); James M. Farley, League City, TX (US); Bruce J. Savatsky, Kingwood, TX (US); Richard E. Pequeno, Baytown, TX (US); Giriprasath Gururajan, Missouri City, TX (US); Nicolas M. De Ketelaere, Brabant Wallon (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 34 days.

(21) Appl. No.: 16/646,459

(22) PCT Filed: Jul. 17, 2018

(86) PCT No.: PCT/US2018/042507
§ 371 (c)(1),
(2) Date: Mar. 11, 2020

(87) PCT Pub. No.: WO2019/070329
PCT Pub. Date: Apr. 11, 2019

(65) Prior Publication Data
US 2020/0279671 A1    Sep. 3, 2020

Related U.S. Application Data

(60) Provisional application No. 62/568,816, filed on Oct. 6, 2017.

(51) Int. Cl.
*H01B 3/44* (2006.01)
*B29C 48/00* (2019.01)
(Continued)

(52) U.S. Cl.
CPC .......... *H01B 3/441* (2013.01); *B29C 48/022* (2019.02); *B29C 48/06* (2019.02); *B29C 48/08* (2019.02);
(Continued)

(58) Field of Classification Search
None
See application file for complete search history.

(56) References Cited

U.S. PATENT DOCUMENTS 5,430,091 A   7/1995 Mahabir
5,795,941 A   8/1998 Cree et al.
(Continued)

FOREIGN PATENT DOCUMENTS

EP         2003166 A1   12/2008
WO   WO 2007-067259 A1   6/2007
(Continued)

OTHER PUBLICATIONS

S. Sheu, (2006), "Enhanced bimodal PE makes the impossible possible", Borouge Pte. Ltd., Shanghai, 30 pgs.
(Continued)

*Primary Examiner* — Fred M Teskin
(74) *Attorney, Agent, or Firm* — ExxonMobil Chemical Patents Inc.-Law Department

(57) ABSTRACT

A bimodal polyethylene is provided. The bimodal polyethylene may include a high molecular weight portion having a weight average molecular weight ($M_w$) of 100,000 g/mol to 1,000,000 g/mol and a low molecular weight portion having a $M_w$ of 10,000 g/mol to 80,000 g/mol. Polymer extrudates, such as cable-coatings and/or wire-coatings and films, including the bimodal polyethylene as well as methods of making the polymer extrudates are also provided.

18 Claims, 15 Drawing Sheets

(51) Int. Cl.

| | |
|---|---|
| *B29C 48/06* | (2019.01) |
| *B29C 48/08* | (2019.01) |
| *C08F 210/02* | (2006.01) |
| *C08J 5/18* | (2006.01) |
| *H01B 13/14* | (2006.01) |
| *B29L 7/00* | (2006.01) |
| *B29L 31/34* | (2006.01) |

(52) U.S. Cl.
CPC .............. *C08F 210/02* (2013.01); *C08J 5/18* (2013.01); *B29K 2023/06* (2013.01); *B29L 2007/008* (2013.01); *B29L 2031/3462* (2013.01); *C08F 2800/10* (2013.01); *C08J 2323/08* (2013.01); *H01B 13/14* (2013.01)

(56) References Cited

U.S. PATENT DOCUMENTS

| | | | |
|---|---|---|---|
| 6,878,784 | B1 | 4/2005 | Asumalahti et al. |
| 7,153,571 | B2 | 12/2006 | Allermann |
| 7,595,364 | B2 | 9/2009 | Shannon et al. |
| 7,855,253 | B2 | 12/2010 | Shannon et al. |
| 8,183,328 | B2 | 5/2012 | Vigano et al. |
| 8,211,985 | B2 | 7/2012 | Vigano et al. |
| 8,378,029 | B2 | 2/2013 | Liu et al. |
| 9,284,415 | B2 | 3/2016 | Allermann et al. |
| 2001/0044508 | A1 | 11/2001 | Loveday et al. |
| 2002/0045711 | A1 | 4/2002 | Backman et al. |
| 2002/0107341 | A1 | 8/2002 | Murray et al. |
| 2003/0088038 | A1 | 5/2003 | Vaughan et al. |
| 2004/0044154 | A1 | 3/2004 | Kuo et al. |
| 2004/0132933 | A1 | 7/2004 | Crowther et al. |
| 2004/0167015 | A1 | 8/2004 | Cann et al. |
| 2006/0122342 | A1 | 6/2006 | Hoang et al. |
| 2006/0275571 | A1 | 12/2006 | Mure et al. |
| 2007/0043176 | A1 | 2/2007 | Martin et al. |
| 2007/0129496 | A1 | 6/2007 | Shannon et al. |
| 2008/0108766 | A1 | 5/2008 | Razavi |
| 2008/0214759 | A1 | 9/2008 | Razavi |
| 2008/0312380 | A1 | 12/2008 | Kwalk et al. |
| 2009/0306323 | A1 | 12/2009 | Kolb et al. |
| 2010/0099824 | A1 | 4/2010 | Helland et al. |
| 2011/0086990 | A1 | 4/2011 | Graham et al. |
| 2011/0118417 | A1 | 5/2011 | Liu et al. |
| 2011/0212283 | A1 | 9/2011 | Fantinel et al. |
| 2011/0212315 | A1 | 9/2011 | Fantinel et al. |
| 2011/0217537 | A1 | 9/2011 | Fantinel et al. |
| 2011/0223406 | A1 | 9/2011 | Fantinel et al. |
| 2011/0230629 | A1 | 9/2011 | Mihan et al. |
| 2013/0072652 | A1 | 3/2013 | Fantinel et al. |
| 2013/0317185 | A1 | 11/2013 | Fantinel et al. |
| 2014/0127427 | A1 | 5/2014 | Vantomme et al. |
| 2015/0133615 | A1 | 5/2015 | Mariott et al. |
| 2016/0024238 | A1 | 1/2016 | Wagner et al. |
| 2016/0347886 | A1 | 12/2016 | Lue et al. |

FOREIGN PATENT DOCUMENTS

| | | |
|---|---|---|
| WO | WO 2012-158260 A1 | 11/2012 |
| WO | WO 2016-027193 A1 | 2/2016 |

OTHER PUBLICATIONS

Chen, et al., (2014), "Modeling and simulation of Borstar bimodal polyethylene process based on rigorous PC-SAFT equation of state model", Industrial & Engineering Chemical Research, 53, pp. 19905-19915.

R. P. Demelo, et al., (2015) "Silane crosslinking from different commercial PEs: Influence of co-monomer, catalyst and type of HLPB as crosslinking coagent", Materials Research, 18, pp. 313-319.

A. Ghosh-Dastidar, et al., (Dow), "Effect of silane grafting level and crosslink structure on properties of moisture crosslinkable systems", International Wire & Cable Symposium, Proceedings of the 57th IWCS, pp. 138-145.

J. Moreshedian, et al., (2009) "Effect of polymer structure and additives on silane grafting of polyethylene", Express Polymer Letters, vol. 3, No. 2, pp. 105-115.

Wong, et al., (1994) "Role of molecular structure on the silane crosslinking of polyethylene: the importance of resin molecular structure change during silane grafting", Polymer, vol. 35, pp. 5447-5452.

POLYETHYLENE EXTRUDATES AND METHODS OF MAKING THE SAME

CROSS-REFERENCE OF RELATED APPLICATIONS

This application is a National Phase Application of PCT Application Serial No. PCT/US2018/042507, filed Jul. 17, 2018, which claims the benefit of U.S. Provisional Application Ser. No. 62/568,816 filed Oct. 6, 2017, the disclosures of both of which are herein incorporated by reference in their entirety.

FIELD OF THE INVENTION

The present disclosure relates to bimodal polyethylenes and extrudates made therefrom having a desirable balance of properties for use in coatings, films and sheets.

BACKGROUND OF THE INVENTION

Polyethylene compositions used in coating applications, such as wire- and cable-coatings, and in film applications, thermoformed articles, blow molded articles and foamed articles, require a balance of many properties as well as good processability. In particular, during processing for coating applications, e.g., wire and cable, polyethylene compositions can suffer from melt flow instability (e.g., melt fracture, sharkskin, stick-slip). Melt instability is believed to be related to the high shear rates (e.g., 1,000-60,000 s$^{-1}$) experienced by such compositions when forming the wire-coating and/or cable-coating as a result of high line speeds (e.g., >600 m/min) utilized in achieving a desired thin layer of polyethylene for such applications. For example, linear low density polyethylene (LLDPE) can experience a high degree of shear flow deformation as it is extruded through an annular die at high shear rates. However, in wire- and/or cable-coating applications, a smooth surface of the polyethylene layer is aesthetically desirable as well as functionally desirable so that the polyethylene layer can have a substantially flawless interface with a conductor layer to maximize electrical properties performance. In addition, reactive processing, e.g., silane grafting and/or crosslinking, also impacts the ability to efficiently and effectively process the compositions for these applications. Furthermore, for film applications, polyethylene compositions require sufficient toughness, stiffness and stability for increased durability and utility. However, achieving a polyethylene with balance of desirable properties along with good processability is challenging.

Thus, there is a need for polyethylene compositions which possess good processability and can be extruded at high shear rates to form "extrudates" including films, wire-coatings and/or a cable-coatings, which have desirable balance of properties.

Related publications include: WO 2007/067259; WO 2012/158260; WO 2015/123179; WO 2016/027193; U.S. Pat. Nos. 5,430,091; 5,795,941; 6,878,784; 7,153,571; 7,855,253; 8,183,328; 8,211,985; 8,378,029; 8,846,188; 8,957,158; 9,284,415; U.S. 2002/0045711; U.S. 2003/0088038; U.S. 2004/0167015; U.S. 2006/0122342; U.S. 2006/0275571; U.S. 2007/0043176; U.S. 2007/0129496; U.S. 2008/0108766; U.S. 2008/0214759; U.S. 2009/0306323; U.S. 2010/0099824; U.S. 2011/0212315; U.S. 2011/0217537; U.S. 2014/0127427; U.S. 2015/0133615; U.S. 2016/0024238; and EP 2003166.

SUMMARY OF THE INVENTION

It has been discovered that a polymer cable- and/or wire-coating and a polymer film having a desirable combination of properties can be achieved by extruding a bimodal polyethylene possessing enhanced processability, wherein the bimodal polyethylene has a high molecular weight portion, particularly having a weight average molecular weight ($M_w$) of 100,000 g/mol to 1,000,000 g/mol, and a low molecular weight portion, particularly having a $M_w$ of 10,000 g/mol to 80,000 g/mol.

Disclosed herein is a polymer cable-coating and/or a wire-coating comprising (or consisting of, or consisting essentially of) a bimodal polyethylene. The bimodal polyethylene comprises at least 80 mol % ethylene and at least one $C_3$-$C_{20}$ olefin comonomer, a high molecular weight portion having a weight average molecular weight ($M_w$) of 100,000 g/mol to 1,000,000 g/mol, and a low molecular weight portion having a $M_w$ of 10,000 g/mol to 80,000 g/mol. The bimodal polyethylene has a density of 0.880 g/cm$^3$ to 0.960 g/cm$^3$, a melt index ($I_2$) of 0.10 g/10 min to 20 g/10 min, a melt index ratio ($I_{21}/I_2$) (MIR) of 40 to 200, a shear thinning index (SHI*) (at 0.1 rad/s)≤0.70 or a SHI* (at 2.0 rad/s)≤0.30; and a percentage hot set ≤80%.

In other aspects, a method for preparing the polymer cable-coating and/or a wire-coating as described herein is disclosed. The method comprises contacting ethylene and at least one $C_3$-$C_{20}$ olefin comonomer with a mixed catalyst in a single reactor to produce the bimodal polyethylene and extruding the bimodal polyethylene at an apparent die wall shear rate ≥500 s$^{-1}$ and a melt temperature ≤250° C. to form the polymer cable-coating and/or wire-coating.

In other aspects, polymer film comprising (or consisting of, or consisting essentially of) a bimodal polyethylene is provided herein. The bimodal polyethylene comprises at least 80 mol % ethylene and at least one $C_3$-$C_{20}$ olefin comonomer, a high molecular weight portion having a weight average molecular weight ($M_w$) of 100,000 g/mol to 1,000,000 g/mol, and a low molecular weight portion having a $M_w$ of 10,000 g/mol to 80,000 g/mol. The bimodal polyethylene has a density of 0.880 g/cm$^3$ to 0.940 g/cm$^3$, a melt index ($I_2$) of 0.10 g/10 min to 10 g/10 min, and a melt index ratio ($I_{21}/I_2$) (MIR) of 40 to 200. The polymer film has a 1% secant modulus (MD or TD)≥32,000 psi, and an Elmendorf Tear (MD or TD) of 40 g to 1000 g.

In other aspects, a method for preparing the polymer film as described herein is disclosed. The method comprises contacting ethylene and at least one $C_3$-$C_{20}$ olefin comonomer with a mixed catalyst in a single reactor to produce the bimodal polyethylene and extruding the bimodal polyethylene at a die pressure ≤2900 psi and a motor load ≤70 amps to form the polymer film.

Additionally disclosed are polymer cable-coatings and/or wire-coatings and polymer films produced according to methods as described herein.

BRIEF DESCRIPTION OF THE FIGURES

The drawings described herein are for illustrative purposes only of selected embodiments and not all possible implementations, and are not intended to limit the scope of the present disclosure.

FIGS. 10a, 10b, 10c, 10d, and 10e show sets of stereo optical microscopy images for cylindrical extrudates (strands) prepared from Comparative PE 1, Comparative PE 2, Comparative PE 3, Comparative PE 5, and Comparative PE 11, respectively, at apparent die wall shear rates ranging from 100 s$^{-1}$ to 10000 s$^{-1}$.

DETAILED DESCRIPTION OF THE INVENTION

Figure 1:
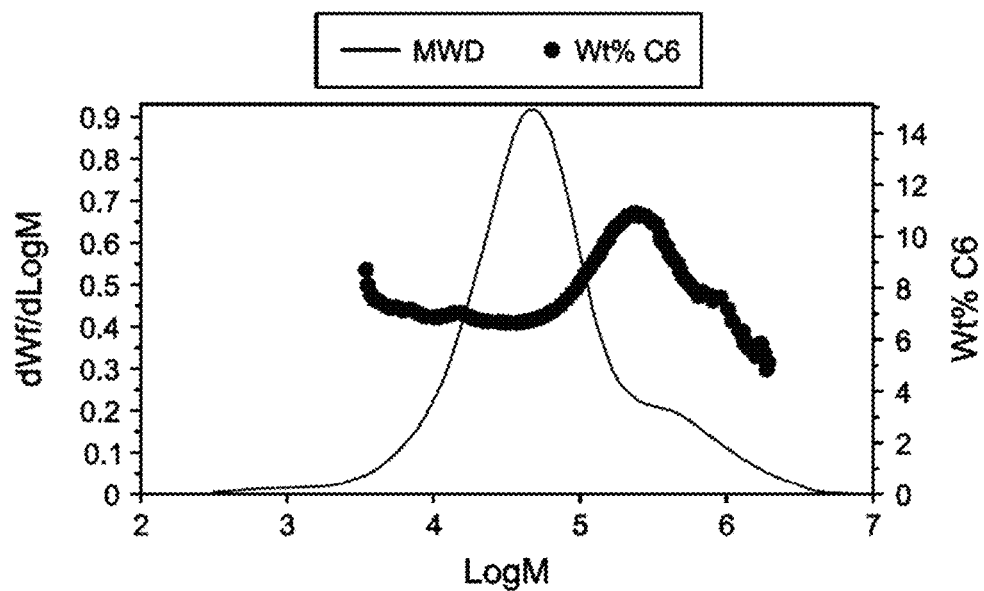
FIG. 1 illustrates molecular weight distribution (MWD) and comonomer distribution for Bimodal Polyethylene 1.

Molecular weight distribution ("MWD") is the ratio of the weight average molecular weight to the number average molecular weight, $M_w/M_n$, of a polymer. The weight average molecular weight is given by $$M_w = \frac{\sum_i n_i M_i^2}{\sum_i n_i M_i},$$

the number average molecular weight is given by $$M_n = \frac{\sum_i n_i M_i}{\sum_i n_i},$$

the z-average molecular weight is given by $$M_z = \frac{\sum_i n_i M_i^3}{\sum_i n_i M_i^2},$$

where $n_i$ in the foregoing equations is the number fraction of molecules of molecular weight $M_i$. Unless indicated otherwise, measurements of $M_w$, $M_z$, and $M_n$, as well as comonomer content of polymers, are determined by Gel Permeation Chromatography (GPC) as described below.

As used herein, the term "mixed catalyst" includes any composition, mixture or system that includes at least two different catalyst compounds, each having the same or a different metal group, but may generally have different ligands or catalyst structure, including a "dual catalyst." Alternatively, each different catalyst compound of a mixed catalyst system can reside on a single support particle, e.g., in which case a mixed catalyst is considered to be a supported catalyst. However, the term mixed catalyst also broadly includes a system or mixture in which one of the catalysts resides on one collection of support particles, and another catalyst resides on another collection of support particles. Preferably, in the latter instance, the two supported catalysts may be introduced to a single reactor, either simultaneously or sequentially, and polymerization may be conducted in the presence of the two collections of supported catalysts. The mixed catalyst can also include a mixture of unsupported catalysts in slurry form.

As used herein, the term "bimodal" refers to a polymer or polymer composition, e.g., polyethylene, having a "bimodal molecular weight distribution." The term "bimodal" is intended to encompass a mixture of at least two discrete molecular weight distributions. A "bimodal" composition can include a polymer component, e.g., polyethylene, with at least one identifiable higher molecular weight component and a polymer component, e.g., polyethylene, with at least one identifiable lower molecular weight component, e.g., two distinct peaks on an SEC curve. A material with more than two different molecular weight distribution peaks will be considered "bimodal" as that term is used, although the material may also be referred to as a "multimodal" composition, e.g., a trimodal or even tetramodal, etc. composition.

Polymer Extrudates

Typically, when polyethylene is extruded at higher shear rates, the polyethylene experiences shear flow deformation and undergoes various forms of melt fracture instabilities (e.g., sharkskin, stick-slip, gross melt fracture) resulting in an undesirably rough extrudate surface. However, it was unexpectedly discovered that bimodal polyethylenes as described herein have improved processability and can be extruded at higher shear rates to produce extrudates, such as cable-coatings and/or wire-coatings, having a substantially smooth surface with minimal melt fracture as well as films having a desirable balance of properties. Thus, in various aspects, polymer extrudates, such as cable-coatings, wire-coatings and/or films, comprising a bimodal polyethylene are provided herein.

Bimodal Polyethylene

In various aspects, the bimodal polyethylene may comprise from 70.0 mol % to 100.0 mol % of units derived from ethylene. The lower limit on the range of ethylene content may be 70.0 mol %, 75.0 mol %, 80.0 mol %, 85.0 mol %, 90.0 mol %, 92.0 mol %, 94.0 mol %, 95.0 mol %, 96.0 mol %, 97.0 mol %, 98.0 mol %, or 99.0 mol % based on the mol % of polymer units derived from ethylene. The bimodal polyethylene may have an upper ethylene limit of 80.0 mol %, 85.0 mol %, 90.0 mol %, 92.0 mol %, 94.0 mol %, 95.0 mol %, 96.0 mol %, 97.0 mol %, 98.0 mol %, 99.0 mol %, 99.5 mol %, or 100.0 mol %, based on polymer units derived from ethylene. In particular, the bimodal polyethylene may comprise at least 80 mol % ethylene.

Additionally or alternatively, the bimodal polyethylene may optionally further comprise polymer units derived from one or more $C_3$-$C_{20}$ olefin comonomers, preferably $C_3$ to $C_{10}$ α-olefins, and more preferably $C_4$ to $C_8$ α-olefins. For example, the bimodal polyethylene may further comprise at least one $C_3$-$C_{20}$ olefin comonomer. In some embodiments, the bimodal polyethylene may have less than 50.0 mol % of polymer units derived from one or more $C_3$-$C_{20}$ olefin comonomers, preferably $C_3$ to $C_{10}$ α-olefins, and more preferably $C_4$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, 1-octene, and mixtures thereof, preferably, an α-olefin, e.g., hexene or octene. The lower limit on the range of $C_3$-$C_{20}$ olefin content may be 25.0 mol %, 20.0 mol %, 15.0 mol %, 10.0 mol %, 8.0 mol %, 6.0 mol %, 5.0 mol %, 4.0 mol %, 3.0 mol %, 2.0 mol %, 1.0 mol %, or 0.5 mol %, based on polymer units derived from the $C_3$-$C_{20}$ olefin. The upper limit on the range of $C_3$-$C_{20}$ olefin content may be 50.0 mol %, 40.0 mol %, 30.0 mol %, 20.0 mol %, 15.0 mol %, 10.0 mol %, 8.0 mol %, 6.0 mol %, 5.0 mol %, 4.0 mol %, 3.0 mol %, 2.0 mol %, or 1.0 mol %, based on polymer units derived from the $C_3$ to $C_{20}$ olefin. Any of the lower limits may be combined with any of the upper limits to form a range. Comonomer content is based on the total content of all monomers in the polymer.

In various aspects, the bimodal polyethylene may comprise a high molecular weight portion, also referred to herein as a "high molecular weight tail," and a low molecular weight portion, also referred to herein as a "low molecular weight tail." The high molecular weight portion of the bimodal polyethylene may have a $M_w$>80,000 g/mol, ≥90,000 g/mol, ≥100,000 g/mol, ≥200,000 g/mol, ≥300,000 g/mol, ≥400,000 g/mol, ≥500,000 g/mol, ≥600,000 g/mol, ≥700,000 g/mol, ≥800,000 g/mol, ≥900,000 g/mol, ≥1,000,000 g/mol or ≥2,000,000 g/mol. Additionally or alternatively, the high molecular weight portion of the bimodal polyethylene may have a $M_w$≤2,500,000 g/mol, ≤2,000,000 g/mol, ≤1,000,000 g/mol, ≤900,000 g/mol, ≤800,000 g/mol, ≤700,000 g/mol, ≤600,000 g/mol, ≤500,000 g/mol, ≤400,000 g/mol, ≤300,000 g/mol, ≤200,000 g/mol, ≤100,000 g/mol, or ≤90,000 g/mol. In some embodiments, the high molecular weight portion of the bimodal polyethylene may have a $M_w$ of 80,000 to 2,000,000 g/mol, 90,000 to 2,000,000 g/mol, 100,000 to 2,000,000 g/mol, 100,000 to 1,000,000 g/mol, 100,000 to 900,000 g/mol, or 200,000 to 700,000 g/mol.

Additionally or alternatively, the low molecular weight portion of the bimodal polyethylene may have a $M_w$>5,000 g/mol, ≥10,000 g/mol, ≥20,000 g/mol, ≥30,000 g/mol, ≥40,000 g/mol, ≥50,000 g/mol, ≥60,000 g/mol, ≥70,000 g/mol, ≥90,000 g/mol, or ≥95,000 g/mol. Additionally or alternatively, the low molecular weight portion of the bimodal polyethylene may have a $M_w$≤100,000 g/mol, ≤95,000 g/mol, ≤90,000 g/mol, ≤80,000 g/mol, ≤70,000 g/mol, ≤60,000 g/mol, ≤50,000 g/mol, ≤40,000 g/mol, ≤30,000 g/mol, ≤20,000 g/mol, or ≤10,000 g/mol. In some embodiments, the low molecular weight portion of the bimodal polyethylene may have a $M_w$ of 5,000 to 100,000 g/mol, 5,000 to 90,000 g/mol, 10,000 to 90,000 g/mol, 10,000 to 80,000 g/mol, 10,000 to 60,000 g/mol, or 10,000 to 50,000 g/mol. In a particular embodiment, a high molecular weight portion of the bimodal polyethylene may have a $M_w$ of 100,000 to 1,000,000 g/mol and a low molecular weight portion of the bimodal polyethylene may have a $M_w$ of 100,000 to 80,000 g/mol.

In various embodiments, the high molecular weight portion of the bimodal polyethylene may present in an amount, based on the total weight of the bimodal polyethylene, ≤80 wt %, ≤70 wt %, ≤60 wt %, ≤50 wt %, ≤40 wt %, ≤30 wt %, ≤20 wt %, ≤10 wt % or ≤5.0 wt %. In some embodiments, the high molecular weight portion of the bimodal polyethylene may present in an amount, based on the total weight of the bimodal polyethylene, of 5.0 wt % to 80 wt %, 5.0 wt % to 60 wt %, 5.0 wt % to 50 wt %, 10 wt % to 50 wt %, 10 wt % to 40 wt %, or 10 wt % to 30 wt %. Additionally or alternatively, the low molecular weight portion of the bimodal polyethylene may present in an amount, based on the total weight of the bimodal polyethylene, ≥30 wt %, ≥40 wt %, ≥50 wt %, ≥60 wt %, ≥70 wt %, ≥80 wt %, ≥90 wt %, or ≥95 wt %. In some embodiments, the low molecular weight portion of the bimodal polyethylene may present in an amount, based on the total weight of the bimodal polyethylene, of 30 wt % to 95 wt %, 40 wt % to 95 wt %, 50 wt % to 95 wt %, 50 wt % to 90 wt % or 70 wt % to 90 wt %. In a particular embodiment, the high molecular weight portion of the bimodal polyethylene may present in an amount ≤50 wt % and the low molecular weight portion of the bimodal polyethylene may present in an amount ≥50 wt %, based on the total weight of the bimodal polyethylene.

The weight average molecular weight ($M_w$) of the bimodal polyethylene may be ≥30,000 g/mol, ≥50,000 g/mol, ≥70,000 g/mol, ≥80,000 g/mol, ≥90,000 g/mol, ≥100,000 g/mol, ≥150,000 g/mol, ≥200,000 g/mol, ≥250,000 g/mol, or ≥500,000 g/mol. Additionally or alternatively, the $M_w$ of the bimodal polyethylene may be ≤600,000 g/mol, ≤500,000 g/mol, ≤300,000 g/mol, ≤250,000 g/mol, ≤200,000 g/mol, ≤150,000 g/mol, ≤100,000 g/mol, ≤90,000 g/mol, ≤80,000 g/mol, ≤70,000 g/mol, ≤50,000 g/mol, or ≤40,000 g/mol. In some embodiments, the $M_w$ of the bimodal polyethylene may be from 30,000 to 600,000 g/mol, 50,000 to 500,000 g/mol, 70,000 to 300,000 g/mol, 70,000 to 250,000 g/mol, 80,000 to 250,000 g/mol, 80,000 to 200,000 g/mol, 90,000 to 200,000 g/mol, or 90,000 to 150,000 g/mol.

In some embodiments, the bimodal polyethylene may have a molecular weight distribution (MWD) or ($M_w/M_n$) from 1.5 to 50, from 3.0 to 30, from 3.0 to 25, or from 5.0 to 20.

In various embodiments, the bimodal polyethylene may have an orthogonal comonomer distribution surprisingly followed by a comonomer distribution with a substantially decreasing content as molecular weight of the bimodal polyethylene increases. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. Both an orthogonal comonomer distribution and comonomer distribution with a substantially decreasing content may be determined using fractionation techniques such as gel permeation chromatography-differential viscometry (GPC-DV). In some embodiments, at a molecular weight (MW) range of 10,000 to 500,000 g/mol, the bimodal polyethylene may have an orthogonal comonomer distribution, and at a molecular weight (MW) range of 500,000 to 2,000,000 g/mol, the bimodal polyethylene may have a comonomer distribution with decreasing comonomer content, for example, as molecular weight (MW) increases. In other embodiments, the bimodal polyethylene may have an orthogonal comonomer distribution throughout the molecular weight range, i.e., comonomer content may increases as molecular weight increases.

In various embodiments, the bimodal polyethylene may have a density ≥0.850 g/cm³, ≥0.860 g/cm³, ≥0.870 g/cm³, ≥0.880 g/cm³, ≥0.890 g/cm³, ≥0.900 g/cm³, ≥0.910 g/cm³, ≥0.920 g/cm³, ≥0.930 g/cm³, ≥0.940 g/cm³, ≥0.950 g/cm³, or ≥0.960 g/cm³. Additionally or alternatively, the bimodal polyethylene may have a density ≤0.970 g/cm³, e.g., ≤0.960 g/cm³, ≤0.950 g/cm³, ≤0.940 g/cm³, ≤0.930 g/cm³, ≤0.920 g/cm³, ≤0.910 g/cm³, ≤0.900 g/cm³, ≤0.890 g/cm³, ≤0.880 g/cm³, ≤0.870 g/cm³ or ≤0.860 g/cm³. In some embodiments, the bimodal polyethylene may have a density of 0.850 g/cm³ to 0.970 g/cm³, 0.870 g/cm³ to 0.970 g/cm³, 0.880 g/cm³ to 0.960 g/cm³, 0.900 g/cm³ to 0.950 g/cm³, or 0.900 g/cm³ to 0.940 g/cm³.

The bimodal polyethylene may have a melt index (MI) ($I_{2.16}$ or simply $I_2$ for shorthand) according to ASTM D1238, condition E (190° C./2.16 kg) reported in decigrams per 10 minutes (g/10 min) or equivalently g/10 min, of ≥0.050 g/10 min, ≥0.10 g/10 min, ≥0.25 g/10 min, ≥0.50 g/10 min, ≥1.0 g/10 min, ≥2.5 g/10 min, ≥5.0 g/10 min, ≥7.5 g/10 min, ≥10 g/10 min, ≥12.5 g/10 min, ≥15 g/10 min, ≥17.5 g/10 min, or ≥20 g/10 min. Additionally or additionally, the bimodal polyethylene may have a melt index ($I_2$)≤25 g/10 min, ≤20 g/10 min, ≤17.5 g/10 min, ≤15 g/10 min, ≤12.5 g/10 min, ≤10 g/10 min, ≤7.5 g/10 min, ≤5.0 g/min, ≤2.5 g/10 min, ≤1.0 g/10 min, ≤0.50 g/10 min, ≤0.25 g/10 min, or ≤0.10 g/10 min. In some embodiments, the bimodal polyethylene may have a melt index ($I_2$) of 0.050 g/10 min to 25 g/10 min, 0.10 g/10 min to 20 g/10 min, 0.10 g/10 min to 15 g/10 min, 0.10 g/10 min to 10 g/10 min, 0.25 g/10 min to 10 g/10 min, or 0.50 g/10 min to 5.0 g/10 min.

The bimodal polyethylene may also have a High Load Melt Index (HLMI) ($I_{21.6}$, or simply $I_{21}$) measured in accordance with ASTM D-1238, condition F (190° C./21.6 kg) reported in decigrams per 10 minutes (g/10 min) or equivalently g/10 min, of ≥35 g/10 min, ≥45 g/10 min, ≥50 g/10 min, ≥75 g/10 min, ≥100 g/10 min, ≥125 g/10 min, ≥150 g/10 min, ≥175 g/10 min, ≥200 g/10 min, ≥225 g/10 min, or ≥250 g/10 min. Additionally or additionally, the bimodal polyethylene may have an HLMI ($I_{21}$)≤275 g/10 min, ≤250 g/10 min, ≤225 g/10 min, ≤200 g/10 min, ≤175 g/10 min, ≤150 g/10 min, ≤125 g/10 min, ≤100 g/min, ≤75 g/10 min, ≤50 g/10 min, or ≤45 g/10 min. In some embodiments, the bimodal polyethylene may have an HLMI ($I_{21}$) of 35 g/10 min to 275 g/10 min, 45 g/10 min to 275 g/10 min, 45 g/10 min to 250 g/10 min, 50 g/10 min to 200 g/10 min, or 50 g/10 min to 100 g/10 min.

In various embodiments, the bimodal polyethylene may have a melt index ratio (MIR or $I_{21}/I_2$) from 40 to 250, 40 to 200, 50 to 200, 60 to 200, 60 to 150 or 75 to 150.

In some embodiments, the bimodal polyethylene may have a percentage (%) hot set ≤90%, ≤80%, ≤70%, ≤60%, ≤50% or ≤40%. Additionally or alternatively, the bimodal polyethylene may have a percentage hot set ≥30%, ≥40%, ≥50%, ≥60%, ≥70%, or ≥80%. In some embodiments, the bimodal polyethylene may have a percentage hot set of 30% to 80%, 30% to 70%, 30% to 60% or 30% to 50%. Hot set (% elongation) was measured according EN 60811-2-1 "International Electrotechnical Commission" test methods for insulating and sheathing materials of electric cables and cords. The hot set is measured on dumbbells cut from strips made on a Haake single screw extruder.

In some embodiments, the bimodal polyethylene may have a shear thinning index (SHI*) (measured at 0.1 rad/s) ≤1.0, ≤0.90, ≤0.80, ≤0.70, ≤0.60, ≤0.50 or ≤0.40. Additionally or alternatively, the polymer cable-coating and/or wire-coating may have an SHI* (measured at 0.1 rad/s)≥0.30, ≥0.40, ≥0.50, ≥0.60, ≥0.70, ≥0.80, or ≥0.90. In some embodiments, the polymer cable-coating and/or wire-coating may have an SHI* (measured at 0.1 rad/s) of 0.30 to 1.0, 0.30 to 0.90, 0.30 to 0.80, 0.3 to 0.7 or 0.4 to 0.6. SHI* (measured at 0.1 rad/s) is the ratio of the complex viscosity at 0.1 rad/s over the complex viscosity at 0.01 rad/s.

Additionally or alternatively, the bimodal polyethylene may have a shear thinning index (SHI*) (measured at 2.0 rad/s)≤0.50, ≤0.40, ≤0.30, ≤0.20, or ≤0.10. Additionally or alternatively, the bimodal polyethylene may have an SHI* (measured at 2.0 rad/s)≥0.050, ≥0.10, ≥0.20, ≥0.30, or ≥0.40. In some embodiments, the bimodal polyethylene may have an SHI* (measured at 2.0 rad/s) of 0.050 to 0.5, 0.050 to 0.30, or 0.050 to 0.20. SHI* (measured at 2.0 rad/s) is the ratio of the complex viscosity at 2 rad/s over the complex viscosity at 0.01 rad/s.

In some embodiments, the bimodal polyethylene may have a complex viscosity (measured at 400 rad/s and 220° C.)≤650 Pa·s, ≤550 Pa·s, ≤500 Pa·s, ≤450 Pa·s, ≤350 Pa·s, or ≤250 Pa·s. Additionally or alternatively, the bimodal polyethylene may have a complex viscosity (measured at 400 rad/s and 220° C.)≥150 Pa·s, ≥250 Pa·s, ≥350 Pa·s, ≥450 Pa·s, ≥500 Pa·s, or ≥550 Pa·s. In some embodiments, the bimodal polyethylene may have a complex viscosity (measured at 400 rad/s and 220° C.) of 150 Pa·s to 650 Pa·s, 150 Pa·s to 550 Pa·s, 150 Pa·s to 500 Pa·s, 150 Pa·s to 450 Pa·s, or 250 Pa·s to 450 Pa·s.

In some embodiments, the bimodal polyethylene may have a corrected shear viscosity (measured at a die wall shear rate of 7,000 s$^{-1}$ and 220° C.)≤100 Pa·s, ≤90 Pa·s, ≤80 Pa·s, ≤70 Pa·s, ≤60 Pa·s, or ≤50 Pa·s. Additionally or alternatively, the bimodal polyethylene may have a corrected shear viscosity (measured at a die wall shear rate of 7,000 s$^{-1}$ and 220° C.)≥40 Pa·s, ≥50 Pa·s, ≥60 Pa·s, ≥70 Pa·s, ≥80 Pa·s, or ≥90 Pa·s. In some embodiments, the bimodal polyethylene may have a corrected shear viscosity (measured at a die wall shear rate of 7,000 s$^{-1}$ and 220° C.) of 40 Pa·s to 100 Pa·s, 400 Pa·s to 80 Pa·s, 40 Pa s to 70 Pa s, or 40 Pa·s to 60 Pa·s.

Additionally or alternatively, the bimodal polyethylene may have a melt elasticity (defined here as the elastic modulus, G') (G')≥1000 Pa, ≥1500 Pa, ≥2000 Pa, ≥2500 Pa, ≥3000 Pa, ≥3500 Pa, ≥4000 Pa, or ≥4500 Pa, or the a melt elasticity (G') in a range from 1000 to 5000 Pa, 2000 to 5000 Pa, 2500 to 5000 Pa, 3000 to 5000 Pa, or 3000 to 4000 Pa.

Also in any embodiment, the bimodal polyethylene may have a melt strength ≥1 cN, ≥2 cN, ≥4 cN, ≥5 cN, ≥10 cN, ≥25 cN, ≥50 cN, ≥75 cN, or 100 cN, or a melt strength in a range from 1 to 100 cN, 1 to 75 cN, 1 to 50 cN, 1 to 25 cN, 2 to 25 cN, 4 to 25 cN or 4 to 20 cN.

Polymer Cable-Coating and/or Wire-Coating Applications

As discussed above, the bimodal polyethylenes described herein may advantageously be extruded at higher shearer rates to produce extrudates having a substantially smooth surface as well as a shiny or glossy surface. Thus, an extrudate comprising a bimodal polyethylene as described herein is provided. In particular, the extrudate may be a wire-coating (e.g., low voltage (LV) or medium voltage (MV) insulation and jacketing) and/or a cable-coating. In various aspects, the wire-coating and/or cable-coating can have an average thickness of ≤5 mm, ≤3 mm, ≤2 mm, ≤1 mm, ≤0.5 mm, ≤0.3 mm, ≤0.2 mm, ≤0.15 mm, ≤0.1 mm, or 0.1 mm. Additionally, the wire-coating and/or cable-coating can have an average thickness from 0.1 mm to 5 mm, 0.1 mm to 3 mm, 0.1 mm to 2 mm, 0.5 mm to 2 mm am.

In some embodiments, the polymer cable-coating and/or wire-coating may have a percentage (%) hot set ≤90%, ≤80%, ≤70%, ≤60%, ≤50% or ≤40%. Additionally or alternatively, the polymer cable-coating and/or wire-coating may have a percentage hot set ≥30%, ≥40%, ≥50%, ≥60%, ≥70%, or ≥80%. In some embodiments, the polymer cable-coating and/or wire-coating may have a percentage hot set of 30% to 80%, 30% to 70%, 30% to 60% or 30% to 50%. Hot set (% elongation) was measured according EN 60811-2-1 "International Electrotechnical Commission" test methods for insulating and sheathing materials of electric cables and cords. The hot set is measured on dumbbells cut from strips made on a Haake single screw extruder.

In various embodiments, a polymer cable-coating and/or a wire-coating comprises a bimodal polyethylene having one or more of the following:
- a density of 0.880 g/cm³ to 0.92, or 0.93, or 0.94, or 0.95, or 0.96 g/cm³;
- a melt index ($I_2$) of 0.10 g/10 min to 20 g/10 min or 0.10 g/10 min to 10 g/10 min;
- a melt index ratio ($I_{21}/I_2$) (MIR) of 40 to 200 or 60 to 200;
- a shear thinning index (SHI*) (at 0.1 rad/s)≤0.70 or ≤0.60;
- a SHI* (at 2.0 rad/s)≤0.30 or ≤0.20;
- a percentage hot set ≤80% or ≤70%;
- a high load melt index ($I_{21}$) of 35 g/10 min to 275 g/10 min or 45 g/10 min to 250 g/10 min;
- a complex viscosity (measured at 400 rad/s and 220° C.)≤550 Pa·s or ≤500 Pa·s or ≤450 Pa·s; and
- a shear viscosity (measured at a die wall shear rate of 7,000 s$^{-1}$ and 220° C.)≤70 Pa·s or ≤60 Pa·s.

In a particular embodiment, a polymer cable-coating and/or a wire-coating comprises a bimodal polyethylene having one or more of the following:
- a density of 0.880 g/cm³ to 0.92, or 0.93, or 0.94, or 0.95, or 0.96 g/cm³;
- a melt index ($I_2$) of 0.10 g/10 min to 20 g/10 min;
- a melt index ratio ($I_{21}/I_2$) (MIR) of 40 to 200;
- a shear thinning index (SHI*) (at 0.1 rad/s)≤0.70 or a SHI* (at 2.0 rad/s)≤0.30; and
- a percentage hot set ≤80%.

Polymer Film Applications

Additionally, the bimodal polyethylenes described herein advantageously may be extruded at lower die pressures and lower motor loads to produce extrudates, such as films, having a desirable balance of properties, such as good mechanical properties (e.g., Elmendorf tear, 1% secant modulus, dart drop impact), good bubble stability and a lower film gel count. Thus, polymer films comprising a bimodal polyethylene as described herein are provided. The polymer films described herein may have any combination of desirable properties as further described below. It is contemplated herein, that the polymer films encompass polymer sheets. In various aspects, the polymer film may have an average thickness of 20 μm to 150 μm, 20 am to 125 μm, or 25 μm to 100 μm microns.

In various aspects, as further described herein, the polymer films can comprise additional polymer layers to form multi-layered films or multi-layered sheets, which may be used to further form various articles, such as but not limited to thermoformed articles, blow molded articles and/or foamed articles.

Also, as used herein, "multi-layered" refers to structures including two or more polymers each forming a flat surface having an average thickness, the same or different, that have been combined together and caused to adhere to one another such as by application of radiation, heat, or use of adhesives to form a single multi-layer structure; preferably formed by a process of coextrusion utilizing two or more extruders to melt and deliver a steady volumetric throughput of different viscous polymers, one of which is the bimodal polyethylene, to a single extrusion head (die) which will extrude the materials in the desired form.

In some embodiments, the polymer films may have a desirable stiffness (as measured by 1% secant modulus) and toughness (as measured by dart drop impact). For example, the polymer films may have a 1% secant modulus (MD or TD), measured according to ASTM D882, ≥25,000 psi (172 MPa), ≥30,000 psi (206 MPa), ≥32,000 psi (220 MPa), ≥34,000 psi (234 MPa), ≥36,000 psi (248 MPa), ≥38,000 psi (262 MPa), ≥40,000 psi (275 MPa), ≥45,000 psi (310 MPa), ≥50,000 psi (344 MPa), or ≥55,000 psi (379 MPa), or within a range from 25,000 psi (172 MPa) to 55,000 psi (379 MPa), 30,000 psi (206 MPa) to 55,000 psi (379 MPa), 32,000 psi (220 MPa) to 55,000 psi (379 MPa), or 36,000 psi (248 MPa) to 55,000 psi (379 MPa). Additionally or alternatively, the polymer films may have a dart drop impact, measured according to ASTM D1709A, ≥60 g, ≥70 g, ≥80 g, ≥85 g, ≥90 g, or ≥100 g, ≥110 g, ≥120 g, ≥130 g, or ≥140 g, or a dart drop impact of 60 g to 140 g, 70 g to 140 g, 80 g to 140 g, or 85 g to 140 g.

The polymer films described herein also may have other desirable properties. In some embodiments, the films may have an Elmendorf Tear (MD or TD), measured according to ASTM 1922, within a range from 30 g to 1200 g, 40 g to 1000 g, 45 g to 900 g, or 45 g to 850 g. Additionally or alternatively, the polymer films may have a film gel count (>200 μm particles)≤40 ppm, ≤30 ppm, ≤20 ppm, ≤15 ppm, ≤10 ppm, or ≤5.0 ppm, or a film gel count (>200 m particles) in a range from 1.0 ppm to 40 ppm, 1.0 ppm to 30 ppm, 1.0 ppm to 20 ppm, 1.0 ppm to 15 ppm or 1.0 ppm to 10 ppm.

Additionally or alternatively, the polymer films may have an elongation at break (MD or TD), measured according to ASTM D882, ≥250%, ≥300%, ≥350%, ≥400%, ≥450%, ≥500%, ≥550%, ≥600%, ≥650%, ≥700%, or ≥750%, or an elongation at break (MD or TD) in a range from 250% to 800%, 300% to 800% or 350% to 800%.

In various embodiments, the polymer film can have one or more of the following:

a 1% secant modulus (MD or TD)≥32,000 psi (220 MPa) or ≥34,000 psi (234 MPa);

an Elmendorf Tear (MD or TD) of 40 g to 1000 go or 45 g to 900 g;

a film gel count (≥200 μm particles)≤30 ppm, or ≤15 ppm;

a dart drop impact ≥70 g or ≥80 g; and an elongation at break (MD or TD)≥300% or ≥350%.

Additionally or alternatively, the polymer film may comprise a bimodal polyethylene having one or more of the following:

a density of 0.880 g/cm³ to 0.940 g/cm³ or 0.900 g/cm³ to 0.940 g/cm³;

a melt index ($I_2$) of 0.10 g/10 min to 10 g/10 min or 0.10 g/10 min to 5.0 g/10 min;

a melt index ratio ($I_{21}/I_2$) (MIR) of 40 to 200 or 60 to 200;

a melt strength ≥4 cN or ≥6 cN;

a melt elasticity (G')≥1000 Pa or ≥3000 Pa; and an HLMI ($I_{21}$) of 45 g/10 min to 150 g/10 min or 45 g/10 min to 100 g/10 min.

In a particular embodiment, the polymer film may comprise a bimodal polyethylene having one or more of (i) a density of 0.880 g/cm³ to 0.940 g/cm³; (ii) a melt index ($I_2$) of 0.10 g/10 min to 10 g/10 min; and (iii) a melt index ratio ($I_{21}/I_2$) (MIR) of 40 to 200; and wherein the polymer film has one or more of (i) a 1% secant modulus (MD or TD)≥32,000 psi; and (ii) an Elmendorf Tear (MD or TD) of 40 g to 1000 g.

In another particular embodiment, the polymer film may comprise a bimodal polyethylene having one or more of:

a density of 0.900 g/cm³ to 0.940 g/cm³;

a melt index ($I_2$) of 0.10 g/min to 5.0 g/min;

a melt index ratio ($I_{21}/I_2$) (MIR) of 60 to 200;

a melt strength of at least 4 cN;

a melt elasticity (G') of ≥1000 Pa; and a high load melt index ($I_{21}$) of 45 g/10 min to 150 g/10 min; and wherein the polymer film has one or more of:

a 1% secant modulus (MD or TD)≥34,000 psi;

an Elmendorf Tear (MD or TD) of 45 g to 900 g;

a film gel count (≥200 μm particles)≤30 ppm;

a dart drop impact ≥70 g; and an elongation at break (MD or TD)≥350%.

Optional Additives

The polymer extrudates described above, e.g. polymer cable-coating and/or wire-coating and polymer film, comprising the bimodal polyethylene described herein may be used in combination with other polymers, additives, processing aids, etc. For example, each layer may comprise a "neat" polymer with optional processing aids and/or additives or may comprise a blend of polymers with optional processing aids and/or additives. In any embodiment, an additive may be present up to 1.0, or 2.0, or 3.0 wt % by weight of polymer extrudates described herein. An additive may be added before, during, or after the formation of the polymer extrudate.

The first antioxidant comprises one or more antioxidants. They include, but are not limited to, hindered phenols, for example, octadecyl-3-(3,5-di-tert.butyl-4-hydroxyphenyl)-propionate (CAS 002082-79-3) commercially available as Irganox™ 1076, pentaerythritol tetrakis (3-(3,5-di-tert-butyl-4-hydroxyphenyl)propionate) (CAS 6683-19-8) commercially available as Irganox™ 1010; and combinations thereof.

They may be combined with one or more polymers in range from 100 to 4000 parts by weight of the first antioxidant, based on one million parts of the polymer or polymer composition; alternatively, from 250 to 3000 parts by weight of the first antioxidant, based on one million parts of the polymer or polymer composition, alternatively, from 500 to 2500 parts by weight of the first antioxidant, based on one million parts of the polymer or polymer composition, alternatively, from 750 to 2500 parts by weight of the first antioxidant, based on one million parts of the polymer or polymer composition, alternatively, from 750 to 2000 parts by weight of the first antioxidant, based on one million parts of the polymer or polymer composition, and alternatively, from 1000 to 2000 parts by weight of the first antioxidant, based on one million parts of the polymer or polymer composition.

The second antioxidant comprises one or more antioxidants. They include, but are not limited to, liquid phosphites, such as $C_2$-$C_7$, preferably $C_2$-$C_4$, and alkyl aryl phosphites mixed structures. Non-limiting examples include mono-amylphenyl phosphites, di-amylphenyl phosphites, dimethylpropyl phosphites, 2-methylbutanyl phosphites, and combinations thereof. In several embodiments of the invention, the second antioxidant may also be represented by the formula [4-(2-methylbutan-2-yl)phenyl]$_x$[2,4-bis(2-methylbutan-2-yl)phenyl]$_{3-x}$ phosphate, wherein x=0, 1, 2, 3, or combinations thereof.

The second antioxidant may be combined with one or more polymers in the range from 100 to 4000 parts by weight of the second antioxidant, based on one million parts of the polymer or polymer composition; alternatively, from 250 to 3000 parts by weight of the second antioxidant, based on one million parts of the polymer or polymer composition, alternatively, from 300 to 2000 parts by weight of the second antioxidant, based on one million parts of the polymer or polymer composition, alternatively, from 400 to 1450 parts by weight of the second antioxidant, based on one million parts of the polymer or polymer composition, alternatively, from 425 to 1650 parts by weight of the second antioxidant, based on one million parts of the polymer or polymer composition, and alternatively, from 1 to 450 parts by weight of the second antioxidant, based on one million parts of the polymer or polymer composition.

The polymers and/or compositions comprising the first antioxidant and/or the second antioxidant described above may be used in combination with the following neutralizing agents, additional additives and other components.

One or more neutralizing agents (also called catalyst deactivators) include, but are not limited to, calcium stearate, zinc stearate, calcium oxide, synthetic hydrotalcite, such as DHT4A, and combinations thereof.

Additional additives and other components include, but are limited to, fillers (especially, silica, glass fibers, talc, etc.) colorants or dyes, pigments, color enhancers, whitening agents, UV stabilizers, cavitation agents, anti-slip agents, lubricants, plasticizers, processing aids, tackifiers, antistatic agents, acid scavengers (e.g., calcium stearate), antifogging agents, nucleating agents (both α-nucleators and (3-nucleators), stabilizers such as lactone and vitamin E, mold release agents, other antioxidants (for example, hindered amines and phosphates), anti-blocking agents, anti-blooming agents, and other common additives as is known in the art. Nucleating agents include, for example, sodium benzoate, talc, and Hyperform™ HPN 68-L (Milliken). Slip agents include, for example, oleamide and erucamide. Additionally, flame retardant fillers may be present in the composition, as described at Column 2 of U.S. Pat. No. 5,430,091 and paragraphs [0044]-[0046] of WO 10 2012/030577.

In any embodiment, nucleating agents may be absent, and preferably, α-nucleating agents may be absent, meaning they are not added to the composition or any components of the composition at any stage of the process of formation.

Examples of α-nucleating agents include salts of monocarboxylic acids and polycarboxylic acids, sorbitols such as dibenzylidenesorbitol, salts of diesters of phosphoric acid, vinylcycloalkane polymers, and others as is known in the art.

Methods of Preparing Bimodal Polyethylene and Extrudates Therefrom

Polymerization Processes

In further embodiments, methods for preparing polymer extrudates, such as cable- and/or wire-coatings and films, are also provided herein. The method may comprise a polymerization process for producing the bimodal polyethylene as described herein followed by extruding the bimodal polyethylene as further provided below to form an extrudate, such as a cable- and/or wire-coating and a film.

The polymerization process for producing the bimodal polyethylene described herein may be carried out in any manner known in the art. Any solution, suspension, slurry, or gas phase polymerization process known in the art can be used. Such processes can be run in a batch, semi-batch, or continuous mode. In some embodiments, the polymerization process is continuous. In some embodiments, homogeneous polymerization processes (such as solution phase and bulk phase processes) can be used. A bulk process is defined to be a process where monomer concentration (e.g., ethylene, $C_3$-$C_{20}$ olefin comonomer) in all feeds to the reactor is 70 volume % or more. In useful bulk polymerization systems, no solvent or diluent is present or added in the reaction medium, (except for the small amounts used as the carrier for the catalyst system or other additives, or amounts typically found with the monomer; e.g., propane in propylene).

Alternately, the polymerization process may be a slurry process. As used herein, the term "slurry polymerization process" means a polymerization process where a supported catalyst is employed and monomers (e.g., ethylene, $C_3$-$C_{20}$ olefin comonomer) are polymerized on the supported catalyst particles and at least 95 wt % of polymer products derived from the supported catalyst are in granular form as solid particles (not dissolved in the diluent).

A slurry polymerization process generally operates between 1 to 50 atmosphere pressure range (15 psi to 735 psi, 103 kPa to 5068 kPa) or even greater and temperatures in the range of 0° C. to 120° C. In a slurry polymerization, a suspension of solid, particulate polymer (e.g., polyethylene) is formed in a liquid polymerization diluent medium to which monomer (e.g., ethylene) and comonomers (e.g., $C_3$-$C_{20}$ olefin) along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

One embodiment of the processes disclosed herein involves a particle form polymerization, or a slurry process where the temperature is kept below the temperature at which the polymer goes into solution. Such technique is well known in the art, and described in, for instance, U.S. Pat. No. 3,248,179; which is fully incorporated herein by reference. The preferred temperature in the particle form process is within the range of 85° C. to 110° C.

In some embodiments, the polymerization process may be a solution polymerization process wherein the monomer and catalyst system are contacted in a solution phase and polymer is obtained therein. In various aspects, a solvent may be present during the polymerization process. Suitable diluents/solvents for polymerization include non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably 0 wt % based upon the weight of the solvents.

In some embodiments, the feed concentration of the monomers (e.g., ethylene) and comonomers (e.g. $C_3$-$C_{20}$ olefin comonomer) for the polymerization may be 60 vol % solvent or less, preferably 40 vol % or less, or preferably 20 vol % or less, based on the total volume of the feedstream. In some embodiments, the polymerization may be run in a bulk process.

Alternatively, the polymerization process may be a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by those of ordinary skill in the art. Make up of gaseous monomer to the circulating gas stream may be at a rate equal to the rate at which particulate polymer product and monomer associated therewith is withdrawn from the reactor and the composition of the gas passing through the reactor may adjusted to maintain an essentially steady state gaseous composition within the reaction zone. The gas leaving the reaction zone may passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone The reactor temperature of the fluid bed process described herein may range from 30° C. or 40° C. or 50° C. to 90° C. or 100° C. or 110° C. or 120° C. In general, the reactor temperature may be operated at the highest temperature that is feasible taking into account the sintering temperature of the polymer product within the reactor. Regardless of the process used to make the bimodal polyethylenes described herein, the polymerization temperature, or reaction temperature should be below the melting or "sintering" temperature of the bimodal polyethylenes to be formed. Thus, the upper temperature limit in one embodiment may be the melting temperature of the bimodal polyethylene produced in the reactor These processes described above can be used for the production of the bimodal polyethylene as described herein. Additionally, comonomers as described herein, e.g., $C_3$-$C_{20}$ olefin comonomers, may be present in the polymerization reactor. When present, the comonomer may be present at any level with ethylene that will achieve the desired weight percent incorporation of the comonomer to achieve the desired density into the finished polyethylene. For example, concentration of comonomer in the bimodal polyethylene may be 3.0 wt % to 20 wt %, 4.0 wt % to 10 wt %, 5.0 wt % to 10 wt %, or 6.0 wt % to 8.0 wt %. In some embodiments, the comonomer may be hexane. Further, the bimodal polyethylene having a high molecular weight portion and a low molecular weight portion may be prepared by using a mixed catalyst.

In various aspects, the mixed catalyst may comprise any suitable metallocene catalysts, any suitable non-metallocene catalysts (e.g., HN5-N catalysts), any suitable single-site catalysts and combinations thereof. For example, the mixed catalyst may comprise (1) a metallocene catalyst and a non-metallocene catalyst; (2) a metallocene catalyst and a single-site catalyst; (3) a non-metallocene catalyst and a single-site catalyst; (4) two metallocene catalysts; (5) two non-metallocene catalysts; and (6) two single-site catalysts.

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

In some embodiments, zirconium transition metal metallocene-type catalyst systems are particularly suitable. Non-limiting examples of metallocene catalysts and catalyst systems useful in practicing the present invention include those described in, U.S. Pat. Nos. 5,466,649, 6,476,171, 6,225,426, and 7,951,873, and in the references cited therein, all of which are fully incorporated herein by reference. In particular embodiments, useful catalyst systems include supported dimethylsilyl bis(tetrahydroindenyl) zirconium dichloride.

The metallocene catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

In some embodiments, the mixed catalyst may comprise bis(2-trimethylphenylamido)ethyl)amine zirconium dibenzyl, bis(2-(pentamethyl-phenylamido)ethyl)amine zirconium dibenzyl, (pentamethylcyclopentadienyl)(n-propylcyclopentadienyl)zirconium dichloride, (tetramethylcyclopentadienyl)(n-propylcyclopentadienyl)zirconium dichloride, (tetramethylcyclopentadienyl)(n-propylcyclopentadienyl)zirconium dimethyl, bis(2-pentamethylphenylamido)ethyl)zirconium dibenzyl, bis(2-pentamethylphenylamido)ethyl)zirconium dimethyl, and combinations thereof. In some embodiments the mixed catalyst may comprise bis(2-pentamethylphenylamido)ethyl)zirconium dibenzyl together with (tetramethylcyclopentadienyl)(n-propylcyclopentadienyl)zirconium dichloride in a 3.0:1 molar ratio. Exemplary suitable mixed catalysts include, but are not limited to those described in U.S. Publication No. 2011/0118417. Suitable commercially available mixed catalysts include, but are not limited to PRODIGY™ Bimodal Catalysts available from Univation Technologies, LLC (Houston, Tex.), e.g., P PRODIGY™ BMC-200 HN5/X-1 catalyst.

Typically, a staged reactor employing two or more reactors in series may be used to produce a bimodal polyethylene, where one reactor may produce, for example, a high molecular weight portion and another reactor may produce a low molecular weight portion. Thus, in some embodiments, the bimodal polyethylenes described herein may be produced using two or more reactors or stages, e.g., two or more gas phase reactors. Such commercial polymerization systems are described in, for example, 2 Metallocene-Based Polyolefins 366-378 (John Scheirs & W. Kaminsky, eds. John Wiley & Sons, Ltd. 2000).

However, advantageously, the bimodal polyethylenes described herein may be produced in a single reactor or single stage, e.g., single gas phase reactor. Thus, ethylene and optionally at least one $C_2$-$C_3$ olefin comonomer as described herein may be contacted with a mixed catalyst as described herein in a single reactor or single stage to produce the bimodal polyethylene as described herein.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa), or in the range of from 250 psig (1724 kPa) to 350 psig (2414 kPa).

In various embodiments, a gas phase reactor employing the mixed catalyst described herein can produce polymer in rates ≥1 lbs/hr (0.455 kg/hr), ≥10 lbs/hr (4.55 kg/hr), ≥100 lbs/hr (45 kg/hr), ≥1000 lbs/hr (455 kg/hr), ≥10,000 lbs/hr (4540 kg/hr), ≥25,000 lbs/hr (11,300 kg/hr), ≥35,000 lbs/hr (15,900 kg/hr), or ≥50,000 lbs/hr (22,700 kg/hr), or can produce polymer in rates from 500 lbs of polymer per hour (227 kg/hr) to 200,000 lbs/hr (90,900 kg/hr).

In various embodiments, hydrogen may be provided to the reactor during polymerization. Adjusting hydrogen ($H_2$) concentration along with other polymerization parameters, such as reactor temperature, can affect final properties of the resultant bimodal polyethylene and extrudates made therefrom. Further, without being bound by theory, it is believed that by tailoring the $M_w$ spread (position of Mw peaks) and split (amount of high $M_w$ portion), e.g., by adjusting the $H_2$ concentration, trim of metallocene component in the mixed catalyst, reactor temperature, and/or modifying the metallocene component (e.g., use a metallocene component coupled with HN5-N component for improved co-monomer incorporation in the high Mw portion), that the extrudate (e.g., wire-coating, cable-coating, film) properties can be improved and optimized.

Other additives may also be used in the polymerization, as desired, such as one or more, scavengers, promoters, modifiers, chain transfer agents, co-activators, reducing agents, oxidizing agents, hydrogen, aluminum alkyls, or silanes.

Aluminum alkyl compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

In a preferred embodiment, little or no scavenger is used in the process to produce the polymer, such as ethylene polymer. Preferably, scavenger (such as trialkyl aluminum, $AlR_3$ as defined above) is present at zero mol %, alternately the scavenger is present at a molar ratio of scavenger metal to transition metal of less than 100:1, preferably less than 50:1, preferably less than 15:1, preferably less than 10:1.

Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, tri-octylaluminum, or a combination thereof.

In various embodiments, the bimodal polyethylene produced as described herein may be in the form of granules and/or powder. In some embodiments, the biomodal polyethylene produced, for example, in granule and/or powder form, may be further formed into pellets.

Extruding Bimodal Polvethylene

In various aspects, the methods may comprise extruding the bimodal polyethylene, for example, from pellet form, under suitable conditions known to those of ordinary skill in the art to form the polymer cable-coating and/or wire-coating as described herein. For example, the bimodal polyethylene may be extruded via single or twin screw extrusion. Advantageously, the bimodal polyethylene may be extruded at higher shear rates without experiencing a high degree of shear flow deformation to form the polymer cable-coating and/or wire-coating as described herein, e.g., at an apparent die wall shear rate ≥500 $s^{-1}$, ≥800 $s^{-1}$, ≥1000 $s^{-1}$, ≥2000 $s^{-1}$, ≥3000 $s^{-1}$, ≥4000 $s^{-1}$, ≥5000 $s^{-1}$, ≥6000 $s^{-1}$, ≥7000 $s^{-1}$, ≥8000 $s^{-1}$, ≥9000 $s^{-1}$, or ≥10000 $s^{-1}$, or at an apparent die wall shear rate from 500 $s^{-1}$ to 10000 $s^{-1}$, 1000 $s^{-1}$ to 10000 $s^{-1}$, 2000 $s^{-1}$ to 9000 $s^{-1}$, 3000 $s^{-1}$ to 9000 $s^{-1}$, or 5000 $s^{-1}$ to 9000 $s^{-1}$. Additionally or alternatively, the blend bimodal polyethylene may be extruded form the polymer cable-coating and/or wire-coating as described herein at a melt temperature ≤300° C., ≤275° C., ≤250° C., ≤220° C., ≤210° C., ≤200° C., ≤190° C., ≤180° C., or ≤160° C. or at a melt temperature from about 150° C. to 300° C., about 160° C. to 250° C., about 180° C. to 220° C., or about 180° C. to 210° C.

In a particular embodiment, the bimodal polyethylene may be extruded at an apparent die wall shear rate ≥500 $s^{-1}$ 1000 $s^{-1}$ and a melt temperature ≤250° C. or ≤220° C. and/or an apparent die wall shear rate ≥3000 $s^{-1}$ and a melt temperature ≤220° C. to form the polymer cable-coating and/or wire-coating as described herein.

In another embodiment, a polymer wire-coating (e.g., low voltage (LV) insulation and jacketing) and/or a cable-coating produced according the above-described method is provided herein.

In other embodiments, the methods may comprise extruding the bimodal polyethylene, for example, from pellet form, under suitable conditions known to those of ordinary skill in the art to form the polymer film as described herein. Advantageously, due to the bimodal polyethylene's enhanced shear thinning and melt strength characteristics, the bimodal polyethylene may be extruded at lower die pressures and lower motor loads to produce polymer films as described herein with enhanced mechanical properties and improved bubble stability while maintaining low gel content. For example, the bimodal polyethylene may be extruded to produce polymer films as described herein at a die pressure ≤3000 psi, ≤2900 psi, ≤2700 psi, ≤2500 psi, ≤2300 psi, ≤2000 psi, ≤1800 psi, or ≤1500 psi, or at a die pressure from 1200 psi to 3000 psi, 1500 psi to 2900 psi, 1500 psi to 2500 psi or 1500 psi 2300 psi. Additionally or alternatively, the bimodal polyethylene may be extruded to produce polymer films as described herein at a motor load ≤75 amps, ≤70 amps, ≤65 amps, ≤60 amps, ≤55 amps, or ≤50 amps, or at a motor load from 45 amps to 75 amps, 45 amps to 70 amps, 50 amps to 65 amps, or 50 amps to 60 amps.

In a particular embodiment, the bimodal polyethylene may be extruded at a die pressure ≤2900 psi and a motor load ≤70 amps and/or at a die pressure ≤2500 psi and a motor load ≤60 amps to form the polymer film as described herein.

In other embodiments, a polymer film as described herein may be prepared via a film blowing process or cast film extrusion.

In another embodiment, a polymer film produced according the above-described method is provided herein.

Other End Use Applications

Various other articles are provided herein, which comprise a bimodal polyethylene as described above. In various aspects, the bimodal polyethylene may be extruded to form films that optionally can comprise additional polymer layers to form multi-layered films or multi-layered sheets, which may be used to further form various articles, such as but not limited to thermoformed articles, blow molded articles and/or foamed articles. As used herein, "multi-layered" refers to structures including two or more polymers each forming a flat surface having an average thickness, the same or different, that have been combined together and caused to adhere to one another such as by application of radiation, heat, or use of adhesives to form a single multi-layer structure; preferably formed by a process of coextrusion utilizing two or more extruders to melt and deliver a steady volumetric throughput of different viscous polymers to a single extrusion head (die) which will extrude the materials in the desired form.

The bimodal polyethylene described herein may be cross-linkable or crosslinked and are particularly suitable for electrical applications including but not limited to insulation, semiconducting or jacketing layers of power cables, telecommunications cables and combined power/telecommunications cables.

In any embodiment, a thermoformed article comprising a bimodal polyethylene described herein is provided. Thermoforming is a fabrication process which involves heating a sheet(s) of material such as a polyolefin and forming it over a male or female mold. The two basic types of thermoforming processes-vacuum forming and pressure forming, and derivative processes such as twin sheet thermoforming-make plastic thermoforming a broad and diverse plastic forming process. Thermoformed plastics are suited for automotive, consumer products, packaging, retail and display, sports and leisure, electronics, and industrial applications. The most advantageous aspects of thermoforming are its low tooling and engineering costs and fast turnaround time which makes thermoforming or vacuuforming ideal for prototype development and low-volume production. Non-limiting examples of thermoformed articles comprising multi-layered sheets described herein include pallets, tubs, dunnage, food containers (especially frozen food containers), and other durable goods.

In any embodiment, a blow molded article is provided herein, which comprises a bimodal polyethylene described herein. Blow molding is a molding process in which air pressure is used to inflate soft plastic into a mold cavity. It is a useful process for making one-piece hollow plastic parts with thin walls, such as bottles and similar containers. Since many of these items are used for consumer beverages for mass markets, production is typically organized for very high quantities. The technology is borrowed from the glass industry with which plastics compete in the disposable or recyclable bottle market. Blow molding is accomplished in at least two steps: (1) fabrication of a starting tube of molten material, called a parison; and (2) inflation of the tube to the desired final shape. Forming the parison is accomplished by either of two processes: extrusion or injection molding.

Extrusion blow molding typically consists of a cycle of 4 to 6 steps. In most cases, the process is organized as a very high production operation for making plastic bottles. The sequence is automated and usually integrated with downstream operations such as bottle filling and labeling. It is preferred that the blown container be rigid, and rigidity depends on wall thickness and the nature of the materials being used. The steps in extrusion blow molding can include: (1) extrusion of parison; (2) parison is pinched at the top and sealed at the bottom around a metal blow pin as the two halves of the mold come together; (3) the tube is inflated so that it takes the shape of the mold cavity; and (4) mold is opened to remove the solidified part.

In injection blow molding, the starting parison is injection molded rather than extruded. A simplified sequence is outlined below. Compared to its extrusion-based competitor, the injection blow-molding process has a lower production rate. The steps of injection blow molding can include: (1) parison is injection molded around a blowing rod; (2) injection mold is opened and parison is transferred to a blow mold; (3) soft polymer is inflated to conform to a blow mold; and (4) blow mold is opened and blown product is removed. Non-limiting examples of blow molded articles comprising multi-layered sheets described herein include drums, bottles, hollow panels, sheds and utility structures.

In any embodiment, a profile is provided herein, which comprises a bimodal polyethylene described herein. Profile extrusion is extrusion of a shaped product that can be a variety of configurations, and can include solid forms as well as hollow forms. Products ranging from tubing to window frames to vehicle door seals are manufactured this way and considered profile extrusion. To process hollow profiled shapes, a pin or mandrel is utilized inside the die to form the hollow section or sections. Multiple hollow sections require multiple pins. To create these hollow sections a source of positive air pressure is required to allow the center of the product to maintain shape and not collapse in a vacuum. When two or more materials are required to make a product, the co-extrusion process is preferably used. For example, a white drinking straw that has two colors of stripes, requires a total of three extruders. Each extruder feeds a different material or variation of the same material into a central co-extrusion die. Non-limiting examples of articles made from (comprising, or consisting of) a profile comprising at least one layer of a high melt strength polypropylene described herein includes pipes, structural frames, siding, tubing, decking, window and door frames (fenestration).

In any embodiment, a foamed article is provided herein, which comprises a bimodal polyethylene described herein. For example, the polymers described herein (e.g., first polyethylene, second polyethylene) may further comprise a foaming agent as is known in the art to effect the formation of air containing pockets or cells within the composition, thus creating an "expanded" or "foamed" films, sheet and/or profile, and article made therefrom. In any embodiment the sheets and/or articles described herein are the reaction product of a foaming agent within the polymer making up the films, sheets, profiles and/or articles made therefrom. This reaction product may be formed into any number of suitable foamed articles such as cups, plates, other food containing items, and food storage boxes, toys, handle grips, automotive components, and other articles of manufacture as described herein.

The various descriptive elements and numerical ranges disclosed herein for the inventive multi-layered structures and methods of forming such can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

General Methods

Unless indicated otherwise, the following test methods were used to determine polymer and extrudate properties.

Hot Set

The hot set method was based on EN 60811-2-1 "International Electrotechnical Commission" test methods for insulating and sheathing materials of electric cables and cords. The hot set test can be defined as a hot creep test. The heat elongation of dumbbells was measured at a 200° C. with a load of 0.2 MPa. Test specimens (dumbbells) were prepared from extruded tapes made on a single screw Haake extruder. The % hot set is an indication of degree of crosslinking where the lower the % hot set, the higher the degree of crosslinking. It is possible to ascertain the degree of crosslinking. Below is a procedure for measuring the hot set:

1. Placed 2 marks at 2 cm distance from each other on the test specimens. Placed the first mark at 1.5 cm from the bottom end.
2. Measured and recorded the thickness of the test specimens. Measured at the center and at each end of the narrow section of the dumbbell. The lowest value was used for the calculation of the cross-sectional area (determination of test weight).
3. Calculated the cross-sectional area (mm²) and determined the correct weight that has to be attached to the specimen—0.2 MPa=20 g/mm². Recorded the weight.
4. Attached the test weights to the bottom side of the test specimens (side with the mark at 1.5 cm from edge). Fixed the upper jaws of the test specimens to the metal frame, in front of the rulers. Recorded position of each mark.
5. Placed the metal frame carefully in the oven after the set temperature was reached.
6. Started the timer and monitored the specimens.
7. Switched on and positioned the lamp.
8. If needed, adjusted the air flow so that the specimens do not move due to air circulation.
9. When specimen(s) broke or elongated to the bottom plate of the oven, recorded the time upon breaking or complete elongation.
10. After 15 minutes in the oven, noted the position of each mark to calculate the hot set (percentage elongation).
11. The hot set value was calculated as follows:

% Hot Set=$(L1-L0)/L0 \times 100$

L0=initial distance between the marks (before elongation)
L1=distance between the marks after elongation (after 15 minutes)

Melt Strength

Melt strength was measured with a Rheotens device, model 71-97, in combination with the capillary rheometer, model Rheotester 1000, both manufactured by Goettfert. In the rheotens test, the tensile force required for extension/stretching of an extruded melt filament exiting a capillary die was measured as a function of the wheel take-up velocity that increases continuously at a constant acceleration speed. The tensile force typically increased as the wheel (roller) velocity was increased and, above a certain take-up velocity, the force remained constant until the filament (strand) breaks. The testing conditions were as follows:

1. Capillary Rheometer (Rheotester 1000)
    Die diameter: 2 mm
    Die length over diameter (L/D): 30/2
    Die temperature: 190° C.
    Piston speed: 0.278 mm/s
    Apparent die wall shear rate: 40.1 s$^{-1}$
2. Strand
    Length: 100 mm
    Velocity at the die exit: 10 mm/s
3. Rheotens (model 71-97)
    Wheel gap: ~0.7 mm (adjusted depending on extrudate swell)
    Wheels: grooved
    Wheel acceleration speed: 2.4 mm/s²

For each material several rheotens curves were generate to verify data reproducibility. The complete amount of material present in the barrel of the Rheotester may be extruded through the die and picked up by the wheels of the Rheotens device. Once the strand was placed between the wheels, the wheel speed was adjusted till a force 0 was measured. This beginning speed Vs was the speed of the strand through the nip of the wheels at the start of the test. Once the test was started, the speed of the wheels was increased with a 2.4 mm/s² acceleration and the tensile force was measured for each given speed. After each strand break, or strand slip between the wheels, the measurement was stopped and the material was placed back between the wheels for a new measurement. A new rheotens curve was recorded. Measuring continues until all material in the barrel was consumed. The average of the tensile force v. draw ratio for each material was reported.

Draw ratio is defined as the ratio of the wheel (rotor) take-up velocity over the velocity of the filament (strand) at the die exit (determined from the mass balance using the mass throughput exiting the die, the cross-sectional of the die without taking into account the extrudate swell and assuming a melt density of 0.76 g/cm³). "Melt strength" is defined as the average tensile force (N or cN) corresponding to the horizontal-like (plateau) portion of the rheotens curve before unsteady force oscillation and/or filament rupture/breakage ("Shear and extensional rheology of polymer melts: Experimental and modeling studies". J. Rheol. 55 (2011), pp. 95-126). In cases, where no plateau was observed in the tensile force v. take-up velocity curve, the melt strength was defined here as the maximum tensile force just before filament slip between the wheels and/or filament rupture/breakage.

Small Angle Oscillatory Shear (SAOS) Frequency Sweep Melt Rheology

SAOS experiments were performed at 190° C. using a 25 mm parallel plate configuration on an MCR501 rotational rheometer (Anton Paar GmbH). Sample test disks (25 mm diameter, 2.5 mm thickness) were made with a Carver Laboratory press at 190° C. Samples were allowed to sit without pressure for approximately 3 minutes in order to melt and then held under pressure typically for 3 minutes to compression mold the sample. The disk sample was first equilibrated at 190° C. for typically 10 min between the parallel plates in the rheometer to erase any prior thermal and crystallization history. An angular frequency sweep was next performed with a typical gap of 1.9 mm from 500 rad/s to 0.01 rad/s angular frequency using 5 points/decade and a strain value within the linear viscoelastic region determined from strain sweep experiments (C. W. Macosko, *Rheology Principles, Measurements and Applications* (Wiley-VCH, New York, 1994). All experiments were performed in a nitrogen atmosphere to minimize any degradation of the sample during the theological testing.

From the storage (G') and loss (G") dynamic moduli (C. W. Macosko, *Rheology Principles, Measurements and Applications* (Wiley-VCH, New York, 1994)), the loss tangent (tan δ), where δ is the phase (loss) angle which is a measure of melt elasticity, is defined for each angular frequency as follows:

$$\tan \delta = \frac{G''}{G'}. \qquad (1)$$

The Van Gurp-Palmen plot (van Gurp, M., Palmen, J. "Time temperature superposition for polymeric blends", in 67(1) Rheol. Bull. 5-7 (1998)) is a plot of the measured phase angle δ as defined in equation (1) v. the complex shear modulus |G*(ω)| which is calculated for each angular frequency co according to equation (2):

$$|G^*(\omega)|=(G'^2+G''^2)^{1/2} \qquad (2).$$

The norm of the complex viscosity |η*| or simply referred to as complex viscosity η* is calculated from G' and G" as a function of frequency co as follows (C. W. Macosko, *Rheology Principles, Measurements and Applications* (Wiley-VCH, New York, 1994)):

$$|\eta^*(\omega)| \equiv \eta^*(\omega) = \frac{(G'^2 + G''^2)^{1/2}}{\omega}. \quad (3)$$

Van-Gurp Palmen plot (vGP-plot) can be used to extract some information on the molecular characteristics, e.g., linear vs. (long) chain branched chains, type of long chain branching, polydispersity etc. (Dealy, M. J., Larson, R. G., "Structure and Rheology of Molten Polymers", Carl Hanser Verlag, Munich 182-183 (2006)). It has been proposed that vGP-plot correlates with the polydispersity of a linear polymer (Trinkle, S., Friedrich, C. "Van Gurp-Palmen plot: A way to characterize polydispersity of linear polymers", in 40 Rheol. Acta 322-328 (2001)). It has been also suggested that vGP-plot can be used to reveal the presence of long chain branching in polyethylene (Trinkle, S., Walter, P., Friedrich, C. "Van Gurp-Palmen plot II—Classification of long chain branched polymers by their topology", in 41 Rheol. Acta 103-113 (2002)].

Capillary Rheology

Capillary shear viscosity data were generated using the RG 120 (Göttfert) capillary rheometer as described in the established test method RHE45-1.1 ("Measurement of the shear viscosity on Capillary Rheometer Göttfert GG120"). Rabinowitch and Bagley corrections were implemented as described in C. W. Macosko, *Rheology Principles, Measurements and Applications* (Wiley-VCH, New York, 1994). Shear viscosity reported in this application is corrected shear viscosity according to the Rabinowitch and Bagley corrections. The test conditions are as follows:

Equipment: Göttfert RG 120 double bore capillary rheometer
Die L/D: 30/1 and 0/1
Temperature: 220° C.
Shear rates: 10 to 10000 sec$^{-1}$
Testing software: LabRheo
Evaluation software: WinRheo II
Correction: Bagley and Rabinowitsch Film Test Methods Unless otherwise indicated, film test methods used are described in WO 2017/048392 or WO 2016/081065.

OSC Gel Testing

The OCS (Optical control systems, OCS GmbH, Germany) gel count analysis for a polyethylene pellet sample was conducted using the OCS Cast Film Gel Counting Extruder (Model ME20 2800). The inspection system used a high speed, digital line scan camera to detect and store images of defects in the polymer film. Transmitted light passed from a light source through the transparent film to the detector in a continuous mode. Defects were classified by size and opacity with resolution as low as 25 microns. Software (FSA100) allows for real-time gel analysis providing absolute gel counts, size classification, and calculation of total defect area (TDA). The film width (4"-5") and thickness (2 mils) were maintained during the extrusion process. Total Defect Area (TDA) was a measurement used to evaluate film appearance and is expressed in parts per million (ppm) of the sum of the surface area of gels divided by six square meters of film. The TDA$_{200}$ is the total number of gels that are larger than 200 microns in size expressed in ppm, while TDA$_{50}$ (≥50 microns) is the total number of gels larger than 50 microns expressed in ppm.

Molecular Weight and Comonomer Composition Determination with PolymerChar GPC-IR The distribution and the moments of molecular weight (Mw, Mn, Mw/Mn, etc.) and the comonomer-ethylene ($C_2$), propylene ($C_3$), butene ($C_4$), hexene ($C_6$), octene ($C_8$), etc. content were determined with a high temperature Gel Permeation Chromatography (Polymer Char GPC-IR and Polymer Char GPC One version 2013g data-processing program) equipped with a multiple-channel band filter based Infrared detector ensemble IR5, in which a broadband channel was used to measure the polymer concentration while two narrow-band channels are used for characterizing composition. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 m Teflon filter and degassed with an online degasser before entering the GPC instrument. The nominal flow rate was 1.0 mL/min and the nominal injection volume was 200 μL. The whole system including transfer lines, columns, detectors were contained in an oven maintained at 145° C. Given amount of polymer sample was weighed and sealed in a standard vial with 80 μL flow marker (Heptane) added to it. After loading the vial in the autosampler, polymer was automatically dissolved in the instrument with 8 mL added TCB solvent. The polymer was dissolved at 160° C. with continuous shaking for 1 hour for most PE samples or 2 hour for PP samples. The TCB densities used in concentration calculation were 1.463 g/ml at room temperature and 1.284 g/ml at 145° C. The sample solution concentration was from 0.2 to 2.0 mg/ml, with lower concentrations being used for higher molecular weight samples.

The concentration, c, at each point in the chromatogram was calculated from the baseline-subtracted IR5 broadband signal, I, using the following equation:

$$c = \alpha I \quad (1),$$

where α is the mass constant determined with PE or PP standards. The mass recovery was calculated from the ratio of the integrated area of the concentration chromatography over elution volume and the injection mass which was equal to the pre-determined concentration multiplied by injection loop volume.

The molecular weight was determined by combining universal calibration relationship with the column calibration which was performed with a series of monodispersed polystyrene (PS) standards. The MW was calculated at each elution volume with following equation.

$$\log M_X = \frac{\log(K_{PS}/K_X)}{a_X + 1} + \frac{a_{PS} + 1}{a_X + 1} \log M_{PS},$$

where the variables with subscript "X" stands for the test sample while those with subscript "PS" stand for PS. In this method, $\alpha_{ps}$ is 0.67 and $K_{ps}$ is 0.000175, while a and K are for other materials as obtained from the published literature (Sun, T. et al. Macromolecules 2001, 34, 6812.), except that for purposes of this invention and the claims thereto, α and K are 0.695 and 0.000579 respectively, for ethylene polymers; α and K are 0.705 and 0.0002288 respectively for propylene polymers; and α and K are 0.695 and 0.000579*(1−0.0075*wt % hexene comonomer), respectively, for ethylene-hexene copolymer.

The comonomer composition was determined by the ratio of the IR detector intensity corresponding to the $CH_3$ and $CH_2$ channels calibrated with a series of PE and PP homo/copolymer standards whose nominal value are predetermined by NMR or FTIR. In particular, this provides the methyl ($CH_3$) per 1000 total carbons (1000TC), denoted as $CH_3/1000TC$, as a function of molecular weight. The short-chain branch (SCB) content per 1000TC, denoted as SCB/1000TC, was then computed as a function of molecular weight by applying a chain-end correction to the $CH_3/1000TC$ signal, assuming each chain to be linear and terminated by a methyl group at each end. The wt % comonomer was then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC.$$

The bulk composition of the polymer from the GPC-IR and GPC-4D analyses was obtained by considering the entire signals of the $CH_3$ and $CH_2$ channels between the integration limits of the concentration chromatogram. First, the following ratio was obtained $$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3/1000TC$ as a function of molecular weight, was applied to obtain the bulk $CH_3/1000TC$. The bulk $CH_3/1000TC$ was converted into bulk SCB/1000TC and then converted to w2 in the same manner as described above.

The reversed-co-monomer index (RCI,m) was computed from the mole % co-monomer ($C_3$, $C_4$, $C_6$, $C_8$, etc.) signal (x2) as a function of molecular weight, where x2 was obtained from the following expression in which n is the number of carbon atoms in the comonomer (3 for $C_3$, 4 for $C_4$, 6 for $C_6$, etc.).

$$x2 = -\frac{200 \, w2}{-100n - 2 \, w2 + n \, w2}.$$

Then the concentration signal, W(z) where $z = \log_{10} M$, was modified to W'(z) by setting to 0 the points in W that are less than 5% of the maximum of W; this is to effectively remove points for which the S/N in the composition signal is low. Also, points of W' for molecular weights below 2000 gm/mole were set to 0. Then W' was renormalized so that $$1 = \int_{-\infty}^{\infty} W' dz.$$

And a modified weight-average molecular weight ($M_w'$) was calculated over the effectively reduced range of molecular weights as follows:

$$M_w' = \int_{-\infty}^{\infty} 10^z * W' dz.$$

The RCI, m was then computed as $$RCI, m = \int_{-\infty}^{\infty} x2(10^z - M_w') W' dz.$$

A reversed-co-monomer index (RCI,w) was also defined on the basis of the weight fraction co-monomer signal (w2/100) and was computed as follows:

$$RCI, w = \int_{-\infty}^{\infty} \frac{w2}{100}(10^z - M_w') W' dz.$$

Note that in the above definite integrals the limits of integration are the widest possible for the sake of generality; however, in reality the signal was only integrated over a finite range for which data was acquired, considering the signal in the rest of the non-acquired range to be 0. Also, by the manner in which W' is obtained, it is possible that W' is a discontinuous function, and the above integrations need to be done piecewise.

Capillary Extrusion for Melt Fracture Assessment

Capillary extrusions for melt fracture assessments were performed with an Instron Tester using a die with D=0.43 mm and L/D=47 at T=220° C. Extrudates were collected at apparent die wall shear rates of 100, 160, 250, 400, 650, 1,000, 1,600, 2,500, 4,000, 6,500, 10,000 $s^{-1}$. The extrudates' surface were also checked with an Olympus MIC-D microscope.

Single Screw Extrusion Process for Melt Fracture Assessment

For assessment of processability and melt fracture performance, a Haake 252 single screw extruder was used. The screw diameter was ¾ inch, the ratio of length over screw diameter (L/D) was 25:1, and the compression ratio was 3:1. A rod die was used with a diameter of 1.871 mm, and the cylindrical strand exiting the die was collected on a steel board. The extruder barrel temperature profile was 170-200-210° C. and the die temperature was set at 210° C. A screw speed of 60 rpm was used for all runs. The mass throughput was determined in lbs/hr. by collecting and weighing pellets exiting the pelletizer over a period of time, typically 1 minute.

Stereo-Optical Microscopy

Stereo-optical microscopy images were acquired using an Olympus SZX-12 stereo microscope equipped with a 0.055 numerical aperture Plan Fluorite 0.5× objective and Leica DFC295 camera. A ring light was used to provide reflected lighting. The camera settings and aperture stop settings were held constant for all translucent white samples. Various lighting conditions were used for the colored samples to provide adequate contrast.

Samples Tested

Unless otherwise indicated, the following bimodal polyethylenes prepared as described herein and comparative polyethylenes used throughout the examples are provided below in Tables 1 and 2, respectively. The polyethylenes in Table 1 and 2 were in pellet form.

TABLE 1

Bimodal Polyethylene Properties

| Polymer | Density ($g/cm^3$) | $I_2$ (g/10 min) | $I_{21}$ (g/10 min) | MIR ($I_{21}/I_2$) |
|---|---|---|---|---|
| Bimodal Polyethylene 1 | 0.928 | 0.57 | 590 | 103.6 |
| Bimodal Polyethylene 2 | 0.929 | 1.0 | 84.7 | 84.7 |
| Bimodal Polyethylene 3 | 0.923 | 0.5 | — | — |

TABLE 2

Comparative Polyethylenes 1-17-Properties

| Comparative Polyethylene (PE) | Polymer | Density (g/cm³) | $I_2$ (g/10 min) | $I_{21}$ (g/10 min) | MIR ($I_{21}/I_2$) |
|---|---|---|---|---|---|
| 1 | LyondellBasell GA808-091 (obtained from LyondellBasell) | 0.921 | 0.70 | 49.26 | 70.37 |
| 2 | Dow ™ DFDA 7530 (obtained from Dow Chemical Co.) | 0.923 | 0.61 | 46.45 | 76.15 |
| 3 | Prepared according to Example 2a as described in U.S. Pat. No. 9,284,415, Table 2 | 0.922 | 0.36 | 27.8 | 77.22 |
| 4 | Enable ™ 2010HA (obtained from ExxonMobil Chemical Co.) | 0.921 | 1.03 | 35.47 | 34.44 |
| 5 | Enable ™ 2010CB (obtained from ExxonMobil Chemical Co.) | 0.921 | 0.99 | 33.05 | 33.38 |
| 6 | Enable ™ 27-05HH (obtained from ExxonMobil Chemical Co.) | 0.927 | 0.50 | | |
| 7 | Enable ™ 27-03HH (obtained from ExxonMobil Chemical Co.) | 0.927 | 0.3 | | |
| 8 | Exceed ™ 1018CA (obtained from ExxonMobil Chemical Co.) | 0.920 | 0.89 | | |
| 9 | LD 071.LR (obtained from ExxonMobil Chemical Co.) | 0.924 | 0.70 | | |
| 10 | LD 103.09 (obtained from ExxonMobil Chemical Co.) | 0.919 | 1.1 | | |
| 11 | LL4004EL (obtained from ExxonMobil Chemical Co.) | 0.926 | 3.83 | 89.89 | 23.47 |
| 12 | Borstar ® FB2230 (obtained from Borealis AG) | 0.923 | 0.2 | | |
| 13 | EXP-656 (equivalent to Exceed ™ XP 6056ML) | 0.916 | 0.5 | | |
| 14 | Exceed 1018 like product made with a metallocene catalyst | 0.918 | 1.0 | | |
| 15 | LL1001.32 | 0.918 | 1.0 | | |
| 16 | StarzEZ100 | 0.92 | 1.0 | | |
| 17 | Enable ™ 23-05HH (obtained from ExxonMobil Chemical Co.) | | | | |

Example 1—Polyethylene Preparation

Reactor conditions for preparation of the bimodal polyethylenes in granular/powder form using a Prodigy™ BMC-200 HN5/X-1 catalyst and an HP-100 catalyst are provided below in Table 3. Granules formed from Run C, after extrusion and palletization, correspond to Bimodal Polyethylene 2. Granules formed from Run E, after extrusion and palletization, correspond to Bimodal Polyethylene 1.

TABLE 3

Reactor Process Conditions

| Run | A | B | C | D | E | F | G | H | I |
|---|---|---|---|---|---|---|---|---|---|
| Catalyst Type | BMC-200 HN5/X-1 | BMC-200 HN5/X-1 | BMC-200 HN5/X-1 | BMC-200 HN5/X-1 | BMC-200 HN5/X-1 | BMC-200 HN5/X-1 | HP-100 | HP-100 | HP-100 |
| Residence Time (hrs) | 4.54 | 4.03 | 4.31 | 4.23 | 4.39 | 5.31 | 4.25 | 4.52 | 5.57 |
| $C_2$ concentration (mole %) | 69.9 | 70.0 | 70.0 | 70.0 | 69.9 | 70.0 | 69.9 | 59.0 | 67.0 |
| $C_2$ partial pressure (psi) | 220 | 220 | 220 | 220 | 220 | 219 | 220 | 179 | 204 |
| $H_2/C_2$ analyzer ratio (ppm/mole %) | 12.51 | 12.63 | 12.47 | 12.51 | 12.52 | 12.63 | 1.93 | 1.94 | 1.89 |

TABLE 3-continued

Reactor Process Conditions

| Run | A | B | C | D | E | F | G | H | I |
|---|---|---|---|---|---|---|---|---|---|
| $C_6$ concentration (mole %) | 0.93 | 0.99 | 2.03 | 2.02 | 2.01 | 2.48 | 1.68 | 1.29 | 1.45 |
| $C_6/C_2$ analyzer ratio | 0.01323 | 0.01415 | 0.02899 | 0.02888 | 0.02877 | 0.03539 | 0.02407 | 0.02184 | 0.02163 |
| $C_6/C_2$ flow rate | 0.0349 | 0.0364 | 0.0801 | 0.0801 | 0.0801 | 0.1011 | 0.0819 | 0.0779 | 0.0818 |
| Iso-pentane (mole %) | 6.7 | 6.7 | 6.3 | 6.3 | 6.3 | 6.2 | 1.4 | 1.9 | 1.8 |
| Reactor pressure (psia) | 314.7 | 314.7 | 314.7 | 314.7 | 314.7 | 313.5 | 314.1 | 304.0 | 304.5 |
| Bed Temperature (° F.) | 177.7 | 177.6 | 177.6 | 177.6 | 177.6 | 177.5 | 185.1 | 185.1 | 185.1 |
| Bed Temperature (° C.) | 80.9 | 80.9 | 80.9 | 80.9 | 80.9 | 80.9 | 85.1 | 85.1 | 85.1 |
| Catalyst feed rate (g/hr) | 3.39 | 3.50 | 3.42 | 3.50 | 3.56 | 3.89 | 11.95 | 14.02 | 12.09 |
| Continuity Aid ppm in polymer | 49.8 | 43.7 | 54.0 | 52.9 | 55.1 | 66.4 | 0.0 | 0.0 | 0.0 |
| Production rate (lb/hr) drops | 111.4 | 127.0 | 117.5 | 119.8 | 115.2 | 95.5 | 140.9 | 131.7 | 118.3 |
| Cat activity matl balance (gm/gm) drops | 14924 | 16477 | 15591 | 15548 | 14671 | 11151 | 5356 | 4258 | 4438 |
| Melt index ($I_2$) g/min | 3.02 | 1.00 | 0.99 | 0.98 | 0.61 | 0.51 | 0.92 | 0.98 | 0.79 |
| HLMI ($I_{21}$) g/min | 223.66 | 123.72 | 87.59 | 82.84 | 46.94 | 46.50 | 14.72 | 15.20 | 15.23 |
| MIR($I_{21}/I_2$) | 74.81 | 128.46 | 91.15 | 84.53 | 99.20 | 90.82 | 15.97 | 15.51 | 19.25 |
| Density (g/cm$^3$) | 0.9429 | 0.9411 | 0.9296 | 0.9278 | 0.9273 | 0.9227 | 0.9173 | 0.9175 | 0.9173 |
| Bulk density (g/cm$^3$) | 0.4777 | 0.4837 | 0.4714 | | 0.4610 | 0.4356 | 0.3333 | 0.3383 | 0.3694 |

Example 2—Polyethylene Characterization

Figure 2:
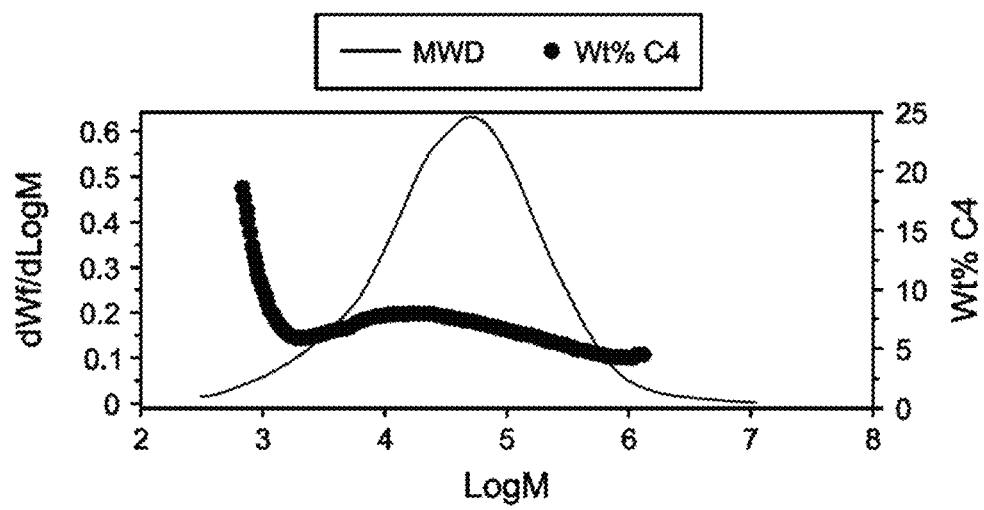
FIG. 2 illustrates MWD and comonomer distribution for Comparative Polyethylene (PE) 2.

The molecular weight distribution (MWD) and comonomer distribution for Bimodal Polyethylene 1 and Dow™ DFDA 7530 (Comparative PE 2) was determined via gel permeation chromatography with four detectors (GPC-4D) and is shown in FIGS. 1 and 2, respectively. As shown in FIGS. 1 and 2, the Bimodal Polyethylene 1 had a bimodal MWD with the co-monomer content increasing for a range of Mw (BOCD character) surprisingly followed by a decrease at higher Mw, which was in contrast with decreasing co-monomer concentration as Mw increases for Dow™ DFDA 7530.

Figure 3:
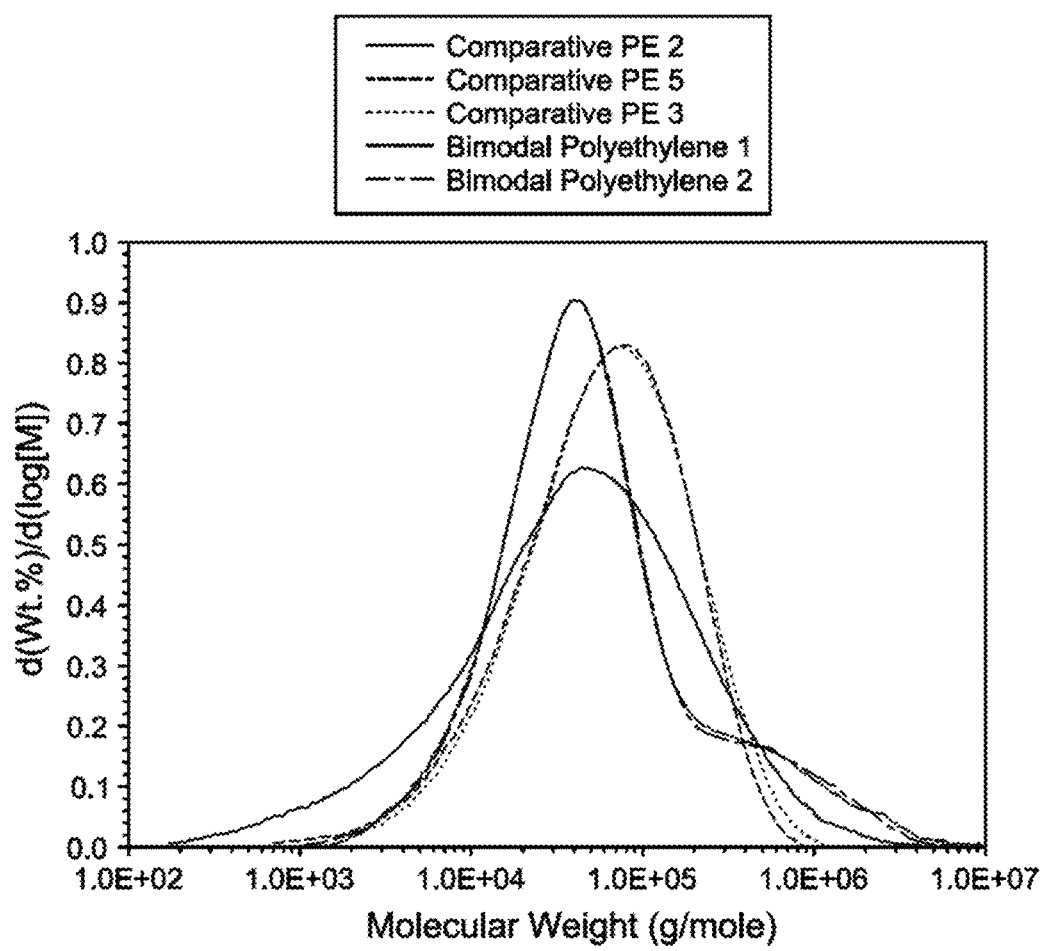
FIG. 3 illustrates molecular weight (g/mole) for Bimodal Polyethylene 1, Bimodal Polyethylene 2, Comparative PE 2, Comparative PE 5, and Comparative PE 3.

Molecular weight for Bimodal Polyethylene 1, Bimodal Polyethylene 2, Dow™ DFDA 7530 (Comparative PE 2), Enable™ 2010CB (Comparative PE 5), and Comparative PE 3 was determined via GPC-4D and is shown in FIG. 3.

Figure 4:
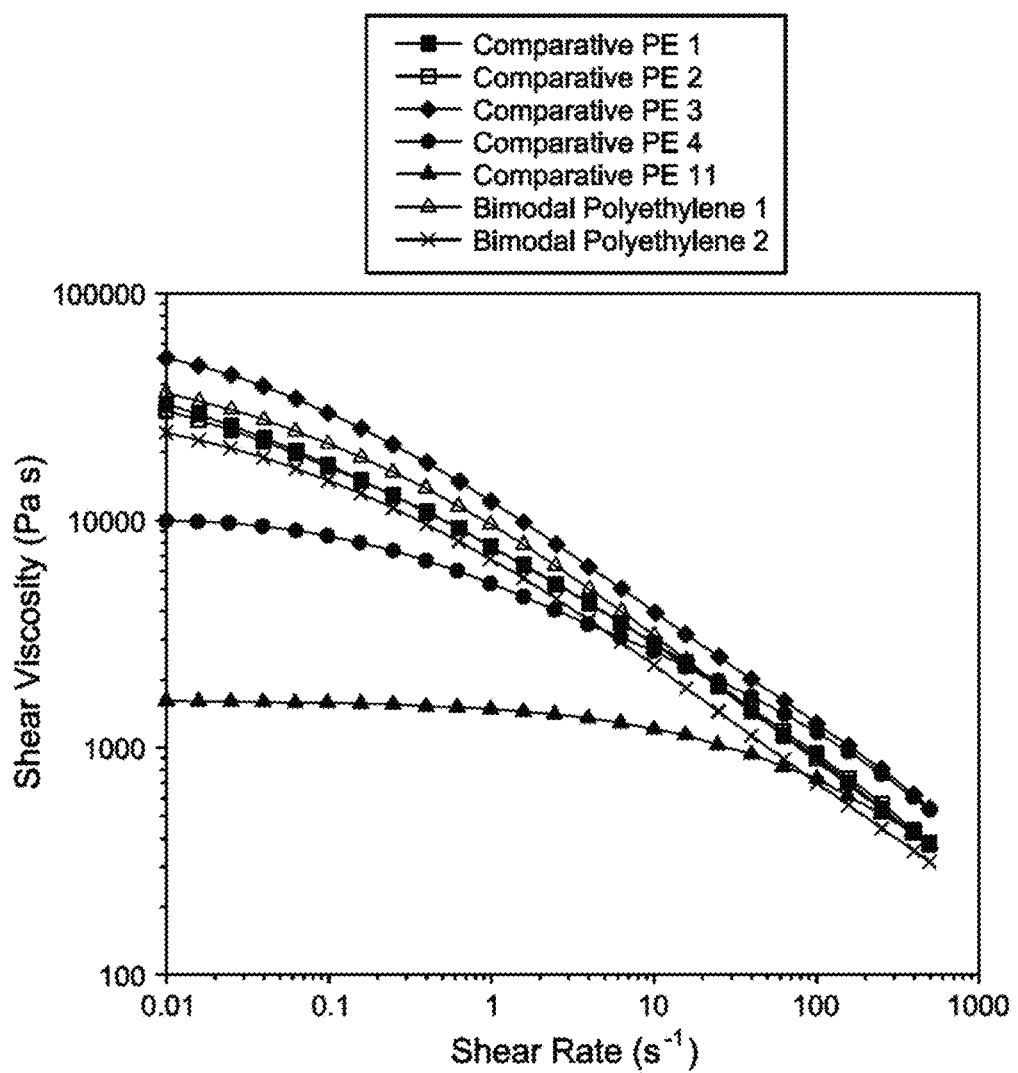
FIG. 4 illustrates shear viscosity (Pa·s) v. shear rate (s$^{-1}$) for Bimodal Polyethylene 1, Bimodal Polyethylene 2, Comparative PE 1, Comparative PE 2, Comparative PE 4, Comparative PE 3, and Comparative PE 11.

Small amplitude oscillatory shear (SAOS) complex viscosity was determined for Bimodal Polyethylene 1, Bimodal Polyethylene 2, LyondellBasell GA808-091 (Comparative PE 1), Dow™ DFDA 7530 (Comparative PE 2), Enable™ 2010HA (Comparative PE 4), Comparative PE 3, and LL4004EL (Comparative PE 11). The results showing shear viscosity v. shear rate is shown in FIG. 4. It is noted that complex viscosity v. angular frequency by SAOS may typically be equivalent to shear viscosity vs. shear rate according to the Cox-Merz rule.

Figure 5:
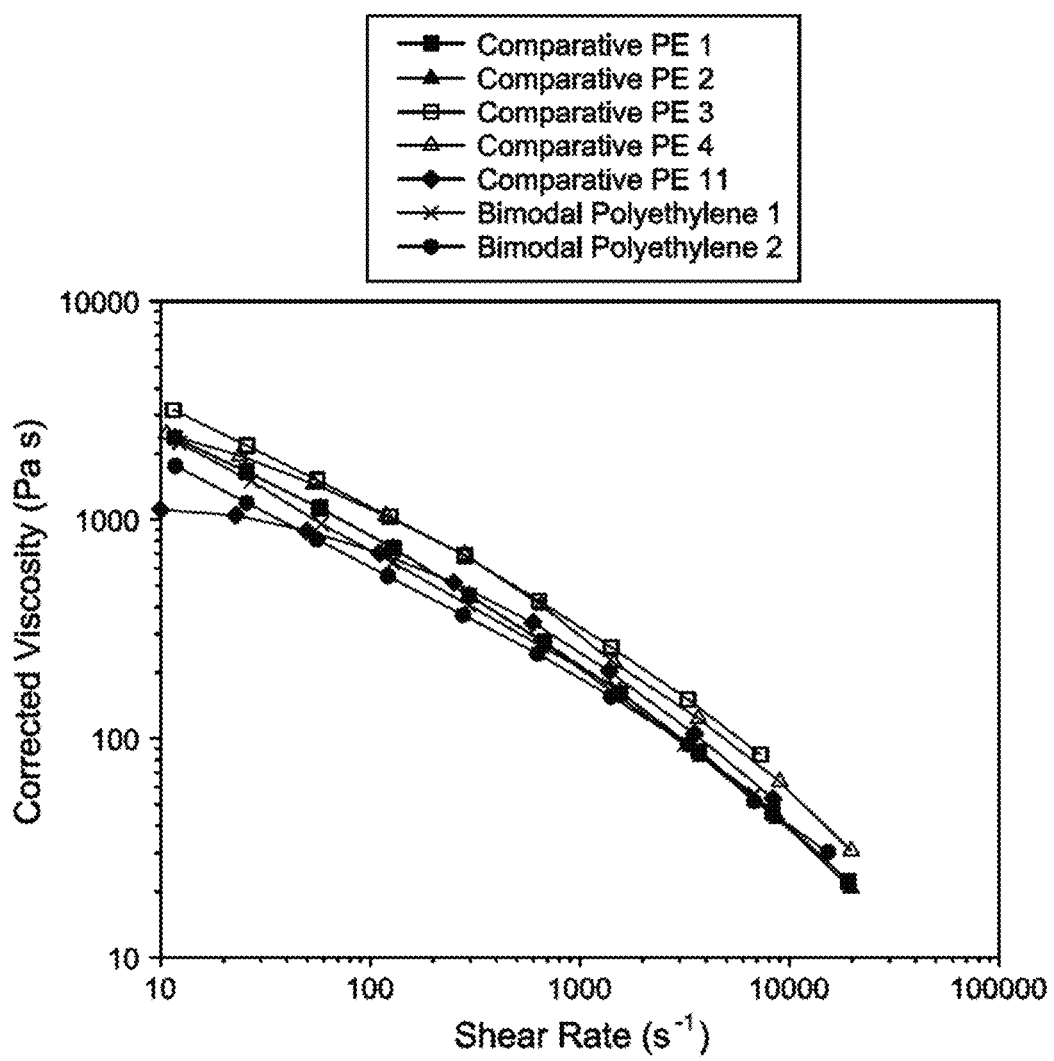
FIG. 5 illustrates the corrected viscosity (Pa·s) v. shear rate (s$^{-1}$) of Bimodal Polyethylene 1, Bimodal Polyethylene 2, Comparative PE 1, Comparative PE 2, Comparative PE 4, Comparative PE 3, and Comparative PE 11.

Corrected shear viscosity was determined for Bimodal Polyethylene 1, Bimodal Polyethylene 2, LyondellBasell GA808-091 (Comparative PE 1), Dow™ DFDA 7530 (Comparative PE 2), Enable™ 2010HA (Comparative PE 4), Comparative PE 3, and LL4004EL (Comparative PE 11), and the results showing corrected viscosity v. shear rate is shown in FIG. 5. As shown in FIGS. 4 and 5, at similar MI ($I_2$) and similar density, Bimodal Polyethylenes 1 and 2 had a significantly higher degree of shear thinning than Enable™ 2010HA, and Comparative PE 3, leading to improved extruder processability. Additionally, at similar MI ($I_2$) and similar density, Bimodal Polyethylenes 1 and 2 have similar or improved degree of shear thinning than LyondellBasell GA808-091 and Dow™ DFDA 7530. Further, at a significantly lower MI ($I_2$) of 0.57-1), a higher Mw and similar density, Bimodal Polyethylenes 1 and 2 had a surprisingly similar or improved degree of shear thinning than LL4004EL (3.8 MI).

Figure 6:
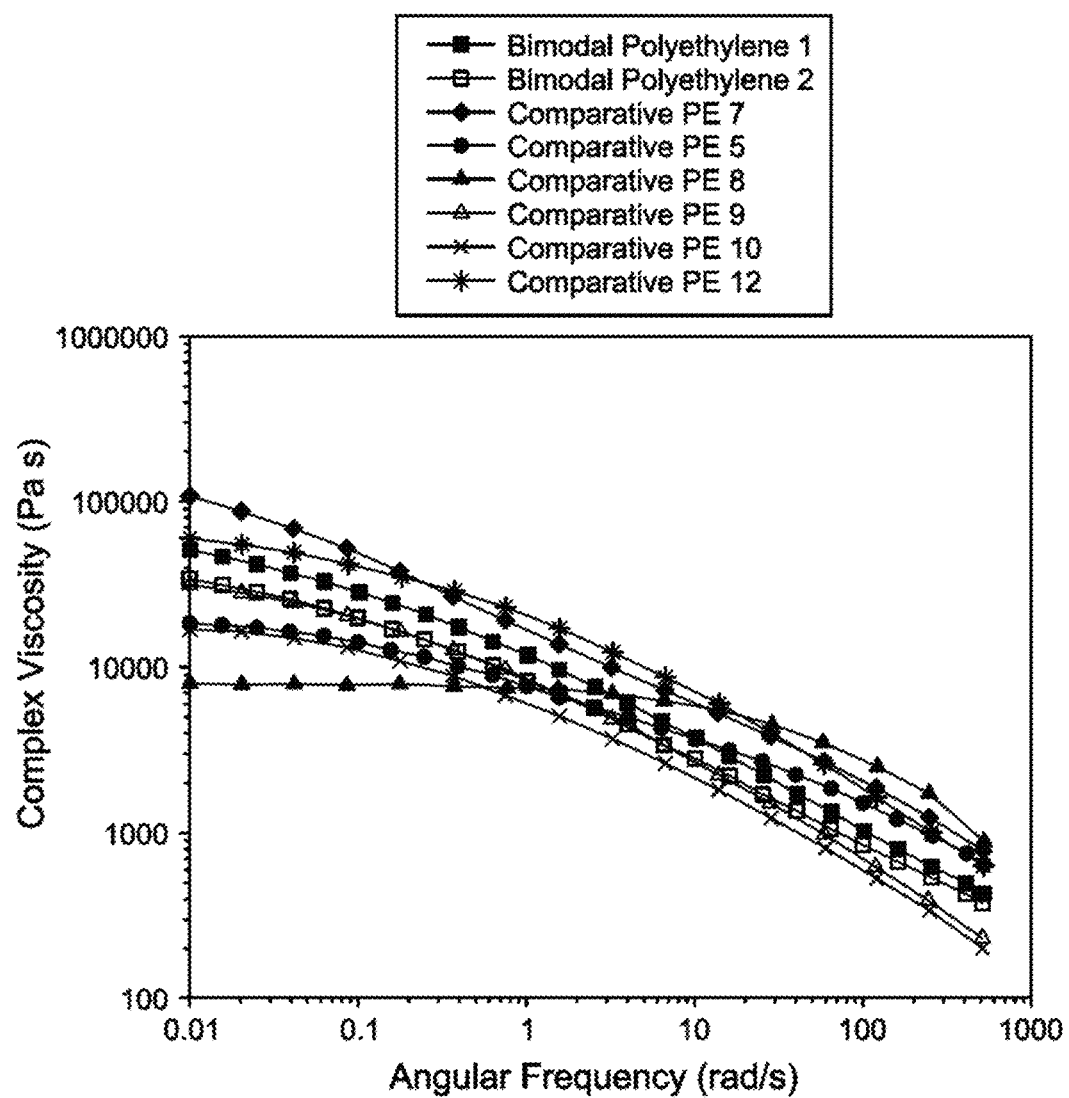
FIG. 6 illustrates small amplitude oscillatory shear (SAOS) complex viscosity (Pa·s) v. angular frequency (rad/s) for Bimodal Polyethylene 1, Bimodal Polyethylene 2, Comparative PE 7, Comparative PE 5, Comparative PE 8, Comparative PE 9, Comparative PE 10 and Comparative PE 12.

SAOS complex viscosity was determined for Bimodal Polyethylene 1, Bimodal Polyethylene 2, Enable™ 27-03HH (Comparative PE 7), Enable™ 2010CB (Comparative PE 5), Exceed™ 1018CA (Comparative PE 8), LD 071.LR (Comparative PE 9), LD 103.09 (Comparative PE 10) and Borstar™ FB2230 (Comparative PE 12). The results shown complex viscosity v. angular frequency is shown in FIG. 6. As shown in FIG. 6, at a similar MI ($I_2$) and similar density, Bimodal Polyethylene 1 and Bimodal Polyethylene 2 had a more pronounced shear thinning relative to Enable™ 27-03HH, Enable™ 2010CB, and Exceed™ 1018CA. For example, at a $I_2$ of ~1, Bimodal Polyethylene 2 had 44% less shear viscosity at 100 rad/s relative to Enable™ 2010CB, and ~67% relative to Exceed™ 1018CA. This contributes to significantly improved extruder processability of the Bimodal Polyethylene 1 and Bimodal Polyethylene 2.

Figure 7:
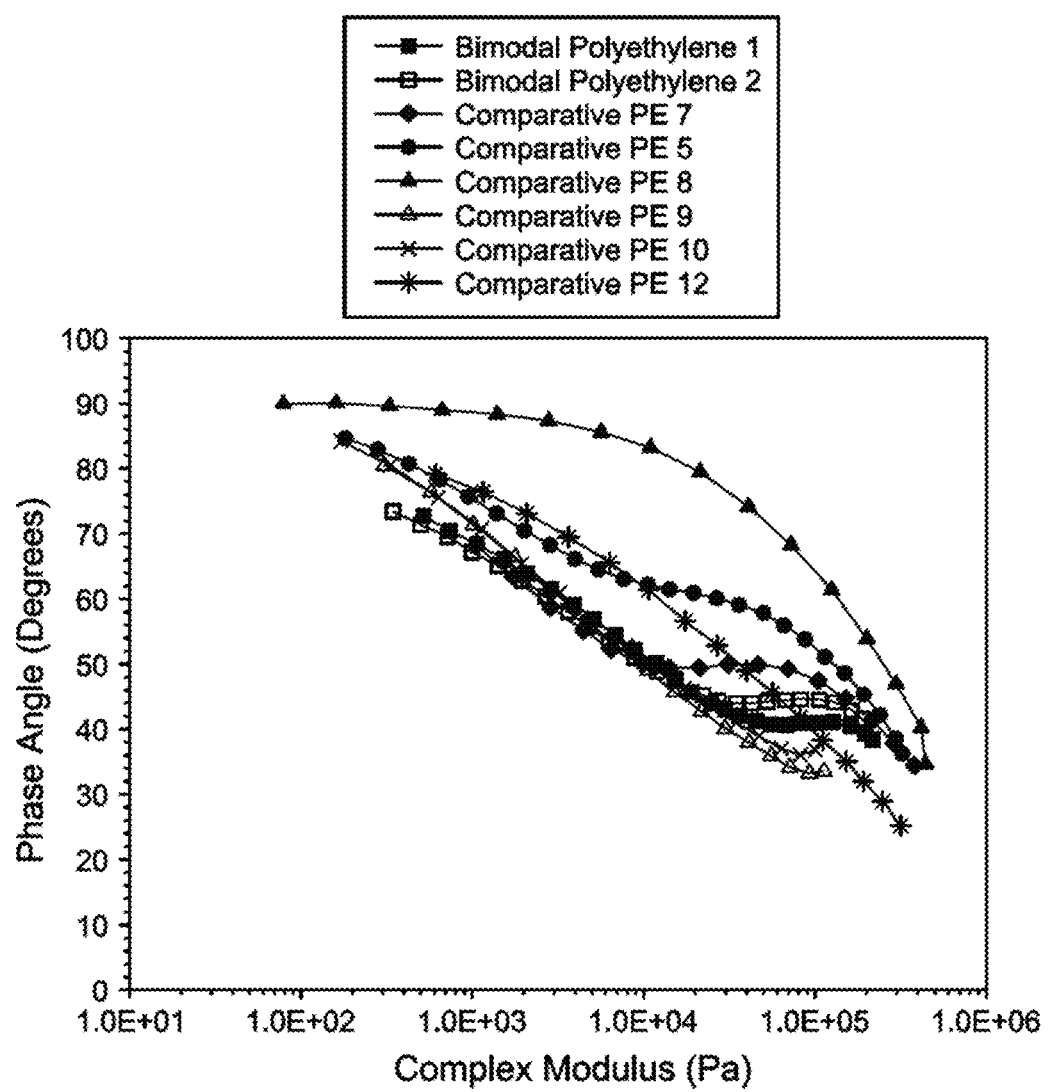
FIG. 7 illustrates Van Gurp-Palmen plots showing phase angle (degrees) v. complex modulus (Pa) for Bimodal Polyethylene 1, Bimodal Polyethylene 2, Comparative PE 7, Comparative PE 5, Comparative PE 8, Comparative PE 9, Comparative PE 10 and Comparative PE 12.

Van Gurp-Palmen plots showing phase angle v. complex modulus for Bimodal Polyethylene 1, Bimodal Polyethylene 2, Enable™ 27-03HH (Comparative PE 7), Enable™ 2010CB (Comparative PE 5), Exceed™ 1018CA (Comparative PE 8), LD 071.LR (Comparative PE 9), LD 103.09 (Comparative PE 10) and Borstar® FB2230 (Comparative PE 12) is shown in FIG. 7. As shown in FIG. 7, at a similar MI ($I_2$) and similar density, Bimodal Polyethylene 1 and Bimodal Polyethylene 2 had surprisingly higher melt elasticity as indicated by lower phase angle for a wide range of angular frequencies relative to Enable™ 27-03HH, Enable™ 2010CB, and Exceed™ 1018CA.

Figure 8:
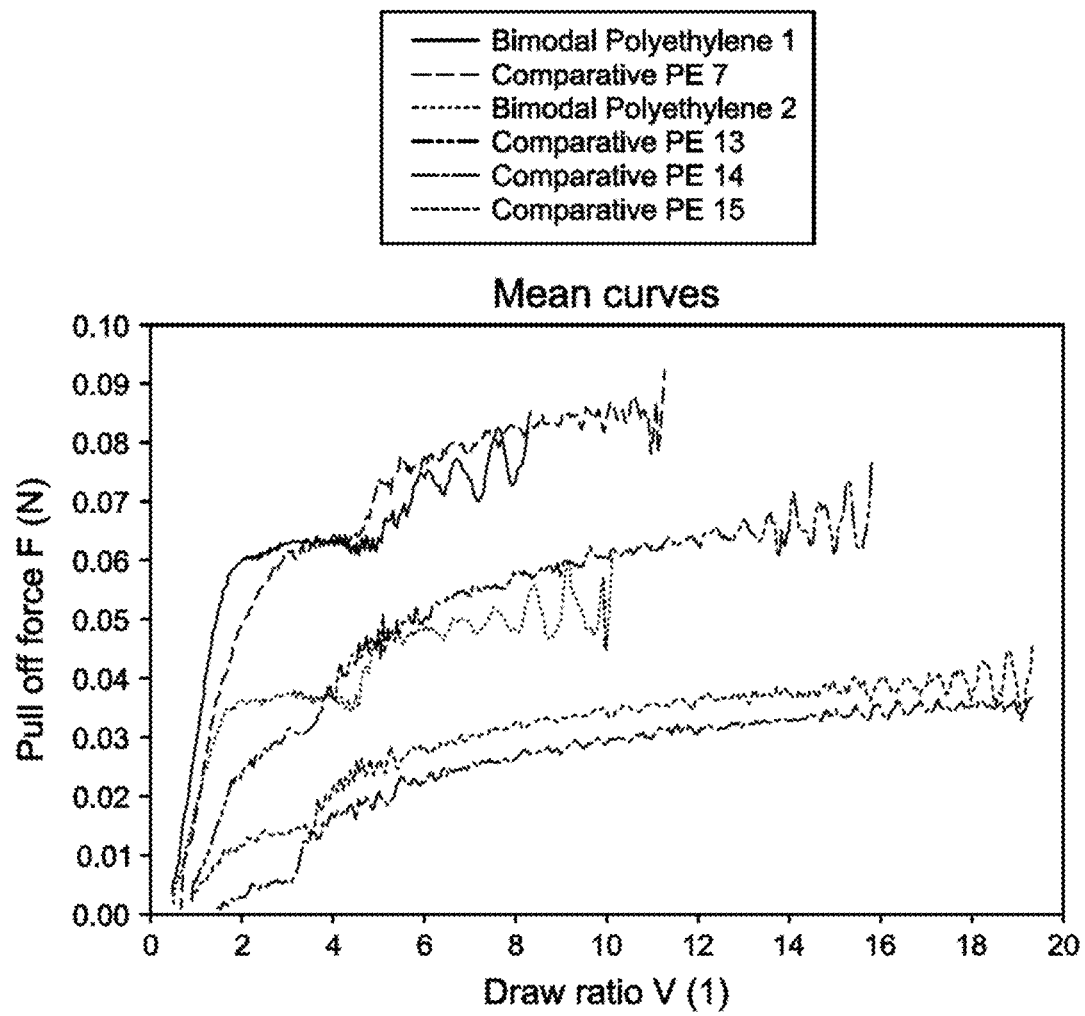
FIG. 8 illustrates Rheotens curves for Bimodal Polyethylenes 1 and 2 and comparative resins, Comparative PE 7, Comparative PE 13, Comparative PE 14, and Comparative PE 15.

Rheotens curves for Bimodal Polyethylenes 1 and 2, Enable™ 27-03HH (Comparative PE 7), Comparative PE 13, Comparative PE 14, and LL1001.32 (Comparative PE 15) is shown in FIG. 8. At a similar $I_2$, Bimodal Polyethylene 2 had a higher melt strength than Comparative PE 14, while at a higher $I_2$ (0.6), Bimodal Polyethylene 1 had a surprisingly similar melt strength to that of Enable™ 27-03HH 2703 with a lower $I_2$ (0.3). Thus, the Bimodal Polyethylene 1 and Bimodal Polyethylene 2 have an improved melt-strength/$I_2$ balance relative to the comparative polyethylenes.

Example 3—Wire-Coating/Cable-Coating Extrudates

Example 3a—Cylindrical Extrudates

Figure 9:
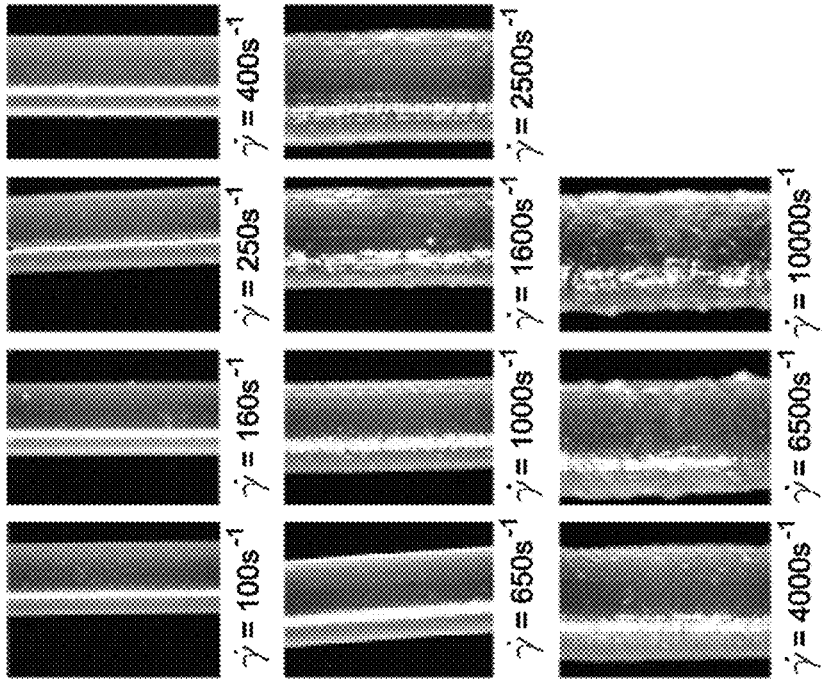
FIGS. 9a and 9b show sets of optical stereo microscopy images for cylindrical extrudates (strands) prepared from Bimodal Polyethylene 1 and Bimodal Polyethylene 2, respectively, at apparent die wall shear rates ranging from 100 s$^{-1}$ to 10000 s$^{-1}$.
Figure 9:
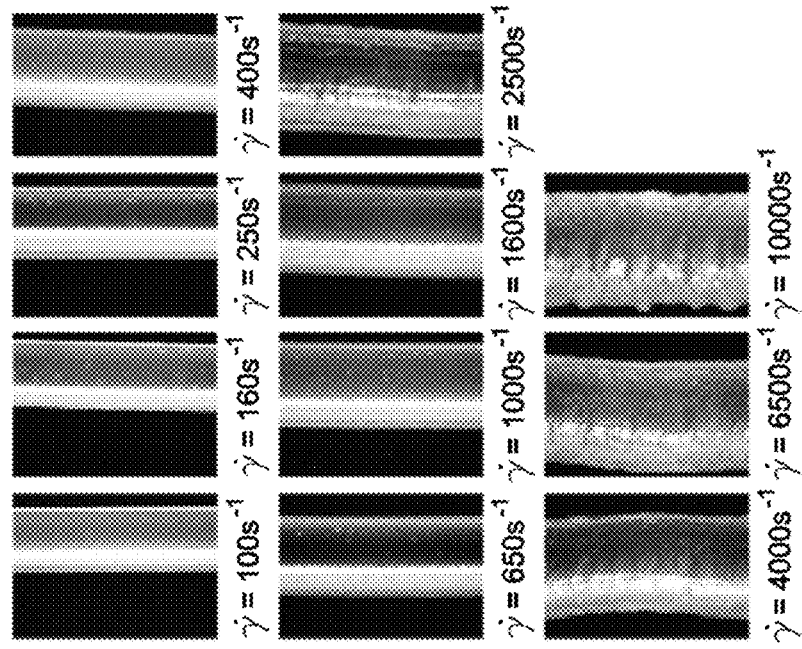
Figure 10A:
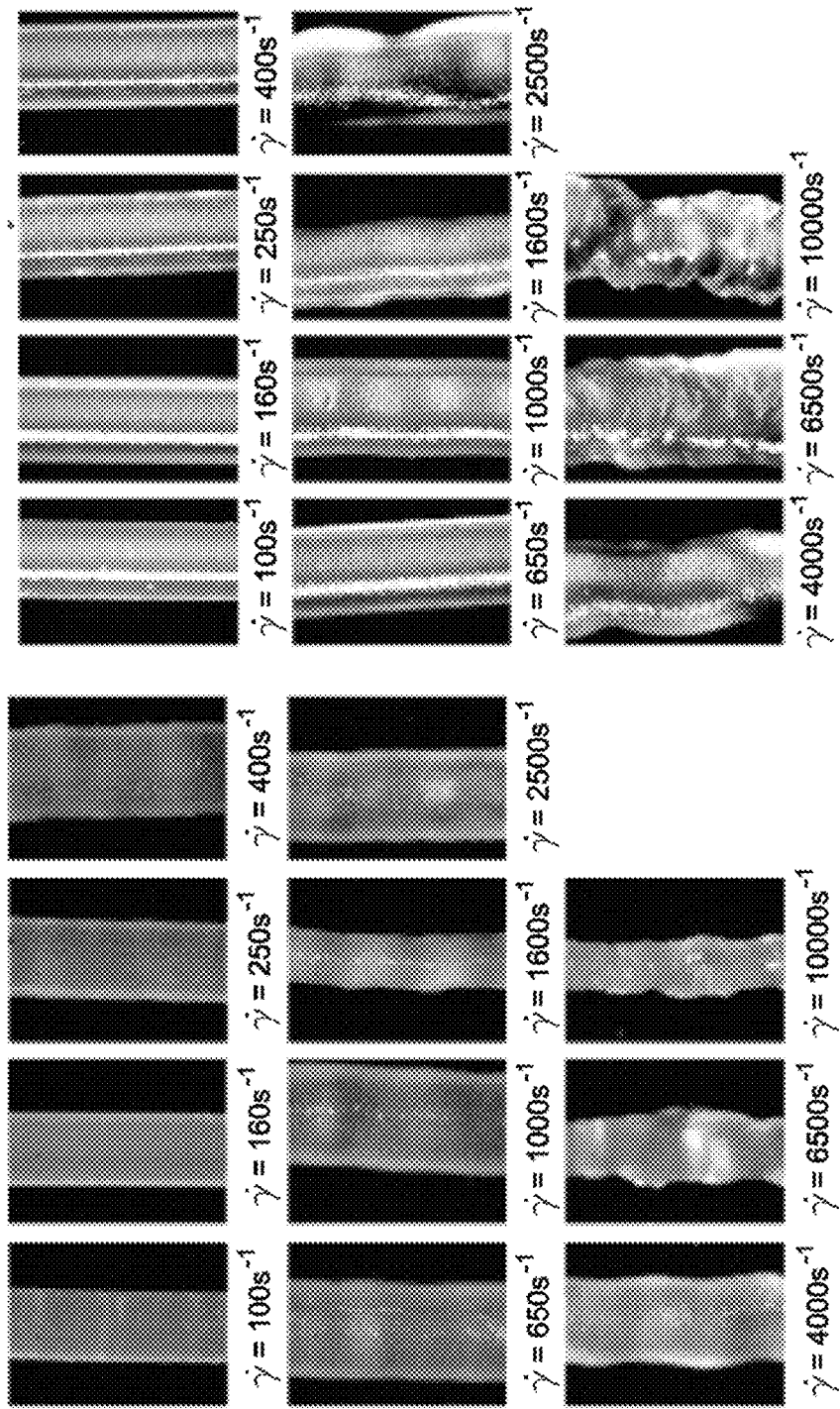
Figure 10B:
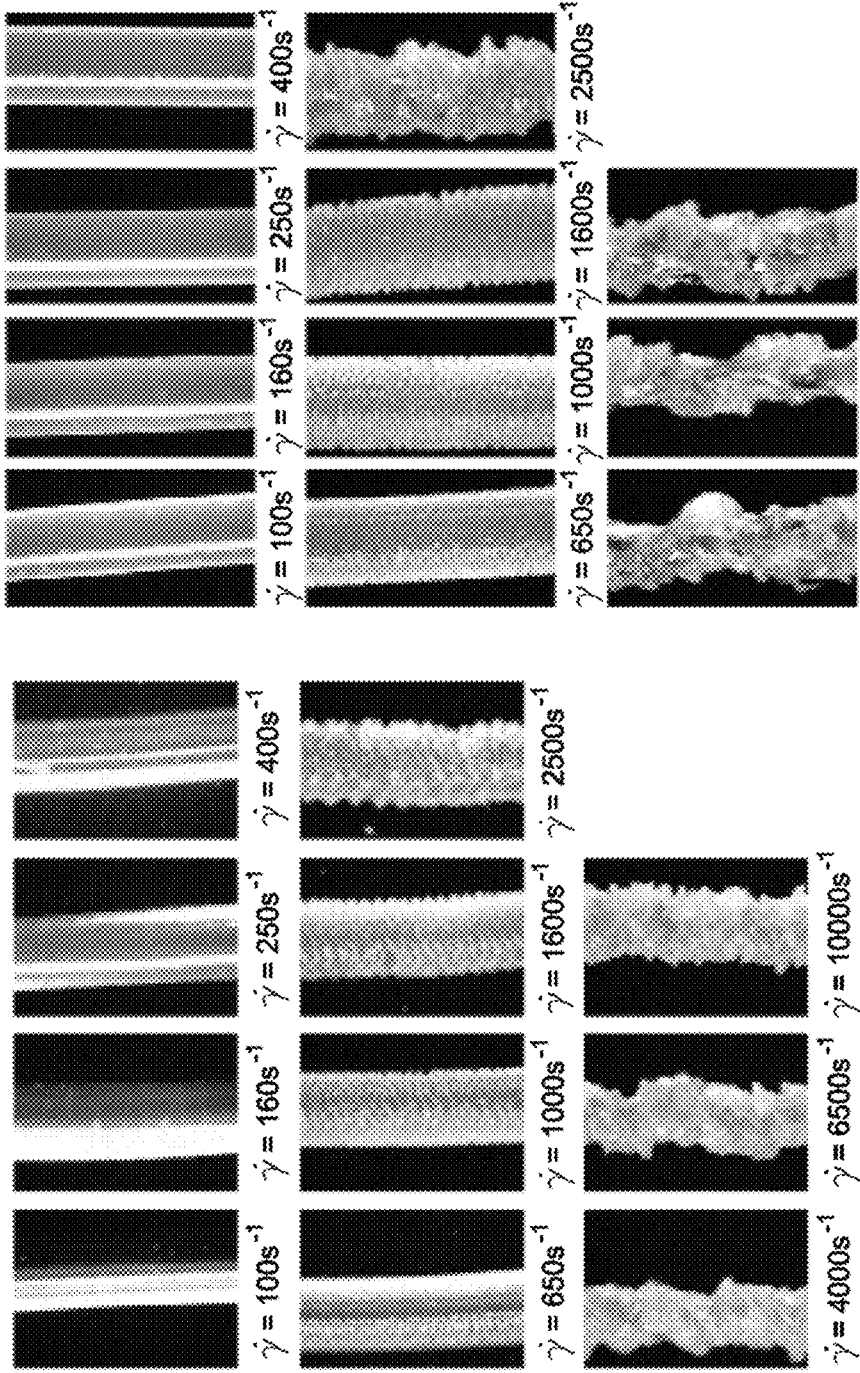
Figure 10C:
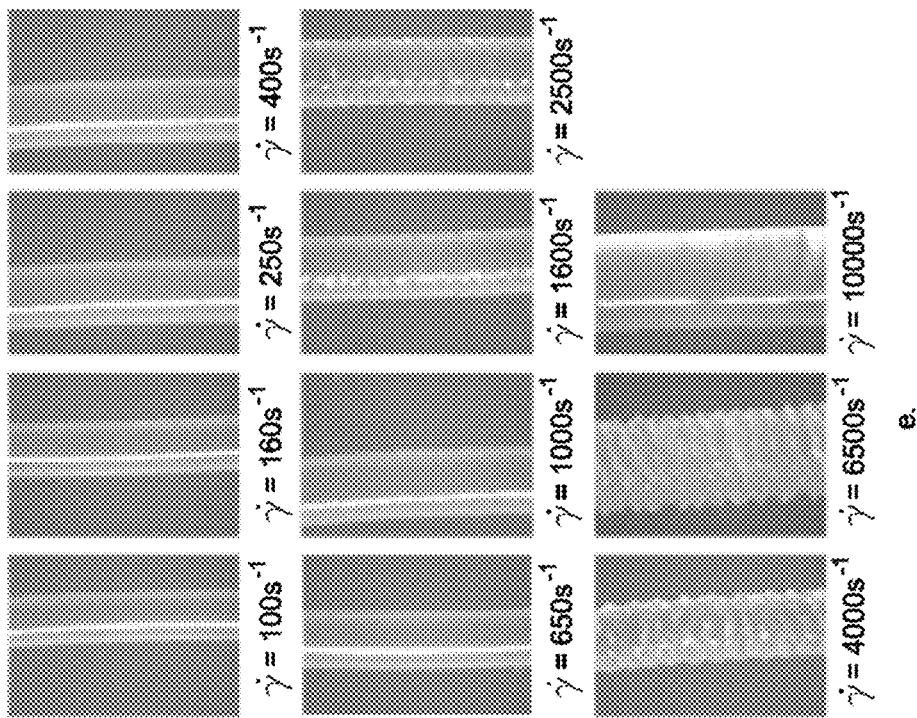
Figure 11:
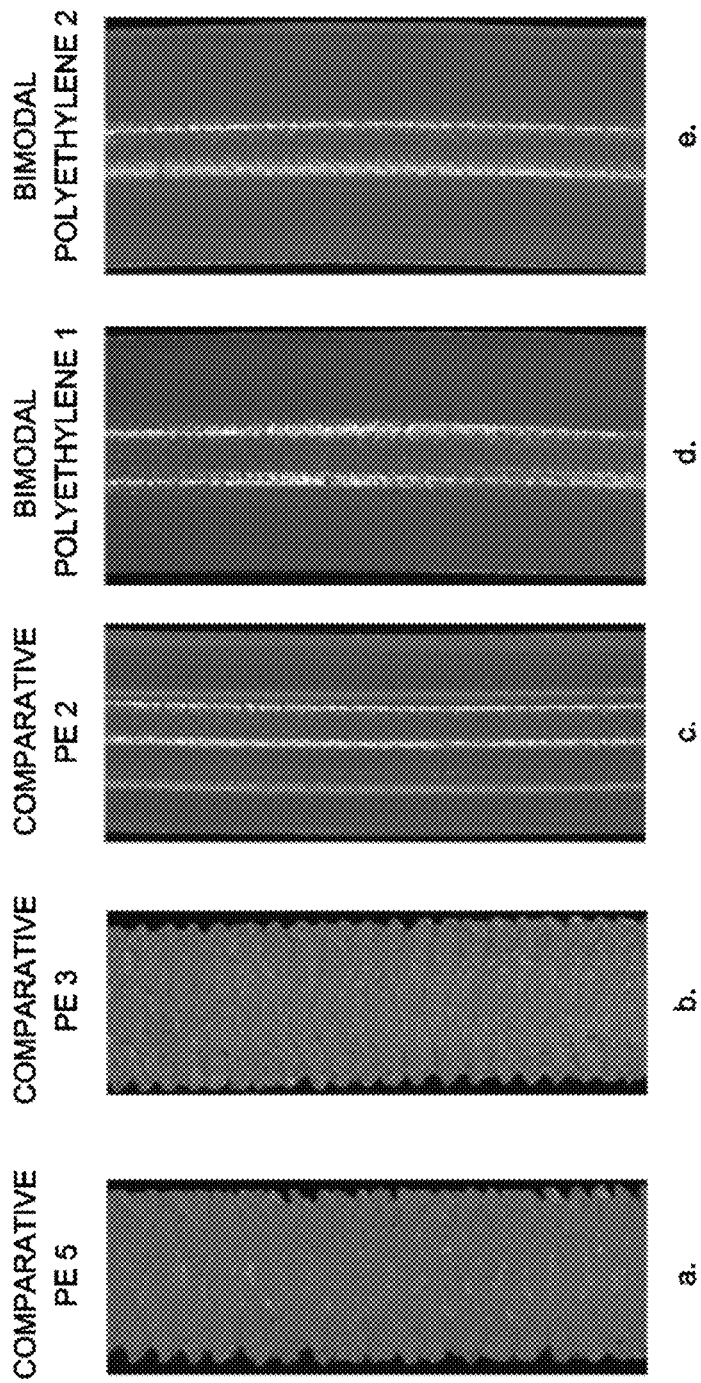
FIGS. 11a, 11b, 11c, 11d, and 11e show optical microscopy images for rod extrudates prepared from Comparative PE 5, Comparative PE 3, Comparative PE 2, Bimodal Polyethylene 1 and Bimodal Polyethylene 2, respectively.

Cylindrical extrudates (strands) were prepared using Bimodal Polyethylene 1, Bimodal Polyethylene 2, LyondellBasell GA808-091, Dow™ DFDA 7530, Comparative PE 3, Enable™ 2010CB, and LL4004EL at various apparent die wall shear rates (100 $s^{-1}$, 160 $s^{-1}$, 250 $s^{-1}$, 400 $s^{-1}$, 650 $s^{-1}$, 1000 $s^{-1}$, 1600 $s^{-1}$, 2500 $s^{-1}$, 4000 $s^{-1}$, 6500 $s^{-1}$, 10000 $s^{-1}$) and at a die temperature of 220° C. from capillary rheometry. Optical microscopy images of the cylindrical extrudates were taken and are shown in FIGS. 9a-9b and FIGS. 10a-10e. FIGS. 9a and 9b show sets of optical microscopy images for cylindrical extrudates prepared from Bimodal Polyethylene 1 and Bimodal Polyethylene 2, respectively, at apparent die wall shear rates ranging from 100 $s^{-1}$ to 10000 $s^{-1}$. FIGS. 10a, 10b, 10c, 10d, and 10e show sets of optical microscopy images for cylindrical extrudates prepared from LyondellBasell GA808-091 (Comparative PE 1), Dow™ DFDA 7530 (Comparative PE 2), Comparative PE 3, Enable™ 2010CB (Comparative PE 5), and LL4004EL (Comparative PE 11), respectively, at apparent die wall shear rates ranging from 100 $s^{-1}$ to 10000 $s^{-1}$.

As shown in FIGS. 9a-9b and FIGS. 10a-10e, at a similar MI ($I_2$) and similar density, cylindrical extrudates prepared using Bimodal Polyethylene 1 and Bimodal Polyethylene 2 showed significantly less melt fracture (MF) sensitivity and significantly smoother extrudate surface at a wider range of shear rates relative to the cylindrical extrudates prepared from Comparative PE 3, Enable™ 2010CB, LyondellBasell GA808-091, and Dow™ DFDA 7530. Additionally, at a significantly lower MI ($I_2$ of 0.57-1), higher Mw and similar density, cylindrical extrudates prepared using Bimodal Polyethylene 1 and Bimodal Polyethylene 2 surprisingly demonstrated less MF sensitivity and smoother extrudate surface at a wider range of die wall shear rates than cylindrical extrudates prepared from LL4004EL (3.8 MI).

Example 3b—Rod Extrudates

Rod extrudates were prepared with a Haake single screw extruder with 1.871 mm rod die using, Enable™ 2010CB, Comparative PE 3, Dow™ DFDA 7530, Bimodal Polyethylene 1, and Bimodal Polyethylene 2 at a die wall shear rate of ~1,000 $s^{-1}$, screw speed of 60 rpm and an extruder temperature profile: 170° C.–200° C.–210° C.–210° C. Optical microscopy images of the cylindrical extrudates were taken and are shown in FIGS. 11a-11e.

FIGS. 11a, 11b, 11c, 11d, and 11e show optical microscopy images for rod extrudates prepared from Enable™ 2010CB (Comparative PE 5), Comparative PE 3, Dow™ DFDA 7530 (Comparative PE 2), Bimodal Polyethylene 1 and Bimodal Polyethylene 2. As shown in FIGS. 11a-11e, at the same process conditions, rod extrudates prepared from Bimodal Polyethylenes surprisingly demonstrated very smooth extrudate surface at a relatively high die wall shear rate (~1,000 $s^{-1}$) and low die temperature (210° C.) similar to that of a rod extrudate prepared from Dow™ DFDA 7530 and significantly smoother surface than the rod extrudates prepared from Enable™ 2010CB and Comparative PE 3.

Example 3c—Tape Extrudates

Tape extrudates were prepared as shown below in Table 4 in a single screw Haake extruder having: a die gap of 0.8 mm, compression ratio of 3:1, a die width of 25 mm, an extruder temperature profile of 180° C.–220° C.–220° C.–250° C., a screw speed of 40 rpm, and a Dynaslyan™ SILFIN 63 input of 0.9 lb/hr.

TABLE 4

Tape Extrudates and Haake Extrusion Conditions

| Tape Extrudate | Polyethylene | Pressure (bar) | Torque (Nm) | Melt Temperature (at the flange of the die) (° C.) | Output (kg/hr) | Thickness (mm) |
|---|---|---|---|---|---|---|
| 1 | Bimodal Polyethylene 1 | 35.5-35.8 | 28.2-31.1 | 208 | 1.33 | 1.35-1.43 |
| 2 | Bimodal Polyethylene 1 (Redo) | 35.2-36.2 | 26.2-31.3 | 209 | 1.28 | 1.09-1.19 |
| 3 | Bimodal Polyethylene 2 | 31.0-31.5 | 23.5-25.2 | 208 | 1.35 | 1.22-1.31 |

TABLE 4-continued

Tape Extrudates and Haake Extrusion Conditions

| Tape Extrudate | Polyethylene | Pressure (bar) | Torque (Nm) | Melt Temperature (at the flange of the die) (° C.) | Output (kg/hr) | Thickness (mm) |
|---|---|---|---|---|---|---|
| Comparative A | LL4004EL Run 1 | 33.0-33.8 | 20.2-22.5 | 208 | 1.38 | 1.11-1.27 |
| Comparative B | LL 4004EL Run 2 (Repeat) | 31.7 | 20.2-22.2 | 209 | 1.36 | 1.05-1.18 |
| Comparative C | LL4004EL Run 3 (Repeat) | 29.6-29.9 | 21-23 | 208 | 1.35 | |
| Comparative D | Comparative PE 3 Run 1 | 59.7-60.5 | 36.1-39.5 | 208 | 1.45 | 1.20-1.41 |
| Comparative E | Comparative PE 3 Run 2 | 58.2-58.5 | 37.3-39.6 | 209 | 1.32 | 1.20-1.38 |
| Comparative F | Comparative PE 3 Run 3 | 56.1-56.4 | 35.1-38.7 | 209 | 1.36 | 1.08-1.15 |
| Comparative G | Comparative PE 3 Run 4 | 55.7-57.9 | 35-38 | 208 | 1.39 | |
| Comparative H | Enable 20-10 US | 42.2-43.5 | 33.1-37.4 | 209 | 1.45 | 1.05-1.13 |
| Comparative I | Enable 20-10 ETC | 43.8-44.3 | 35.3-39.4 | 209 | 1.45 | 1.04-1.25 |
| Comparative J | LyondellBassell GA808-091 | 38.8-40.4 | 20.6-22.3 | 209 | 1.28 | 1.20-1.30 |
| Comparative K | Dow DFDA 7530 | 37.3-37.6 | 21.3-22.5 | 208 | 1.27 | 1.10-1.19 |

Figure 12:
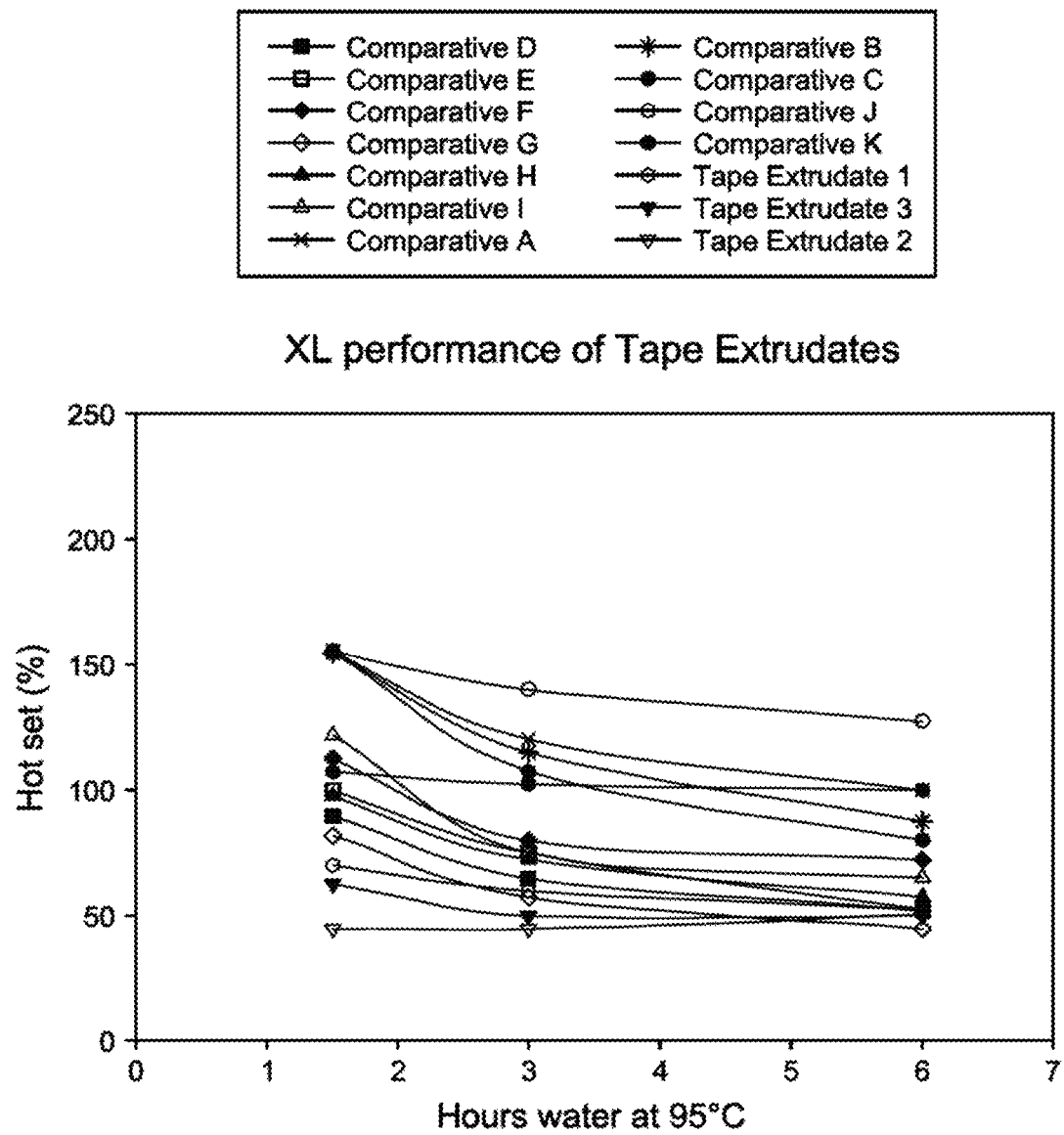
FIG. 12 illustrates percentage (%) hot set as a function of time curing in water at 95° C. for dumbbell specimens cut out of Tape Extrudates 1-3 and Comparative Tape Extrudates A-K.

Percentage (%) hot set as a function of time curing in water at 95° C. was determined as described in EN 60811-2-1 with dumbbell specimens cut out of the tape extrudates in Table 4 and the results are shown in FIG. 12. As shown in FIG. 12, at a similar MI ($I_2$), Tape Extrudates 1-3 surprisingly demonstrated significantly lower % hot set values (beyond experimental variability) relative to both Comparative Tape Extrudates J and K, indicative of better silane grafting/crosslinking efficiency for Tape Extrudates 1-3. Additionally, at a similar MI ($I_2$), Tape Extrudates 1-3 surprisingly demonstrated overall lower % hot set values (beyond experimental variability) with faster cure kinetics relative to Comparative Tape Extrudates D-I, indicative of better silane grafting/crosslinking efficiency for Tape Extrudates 1-3.

Figure 13:
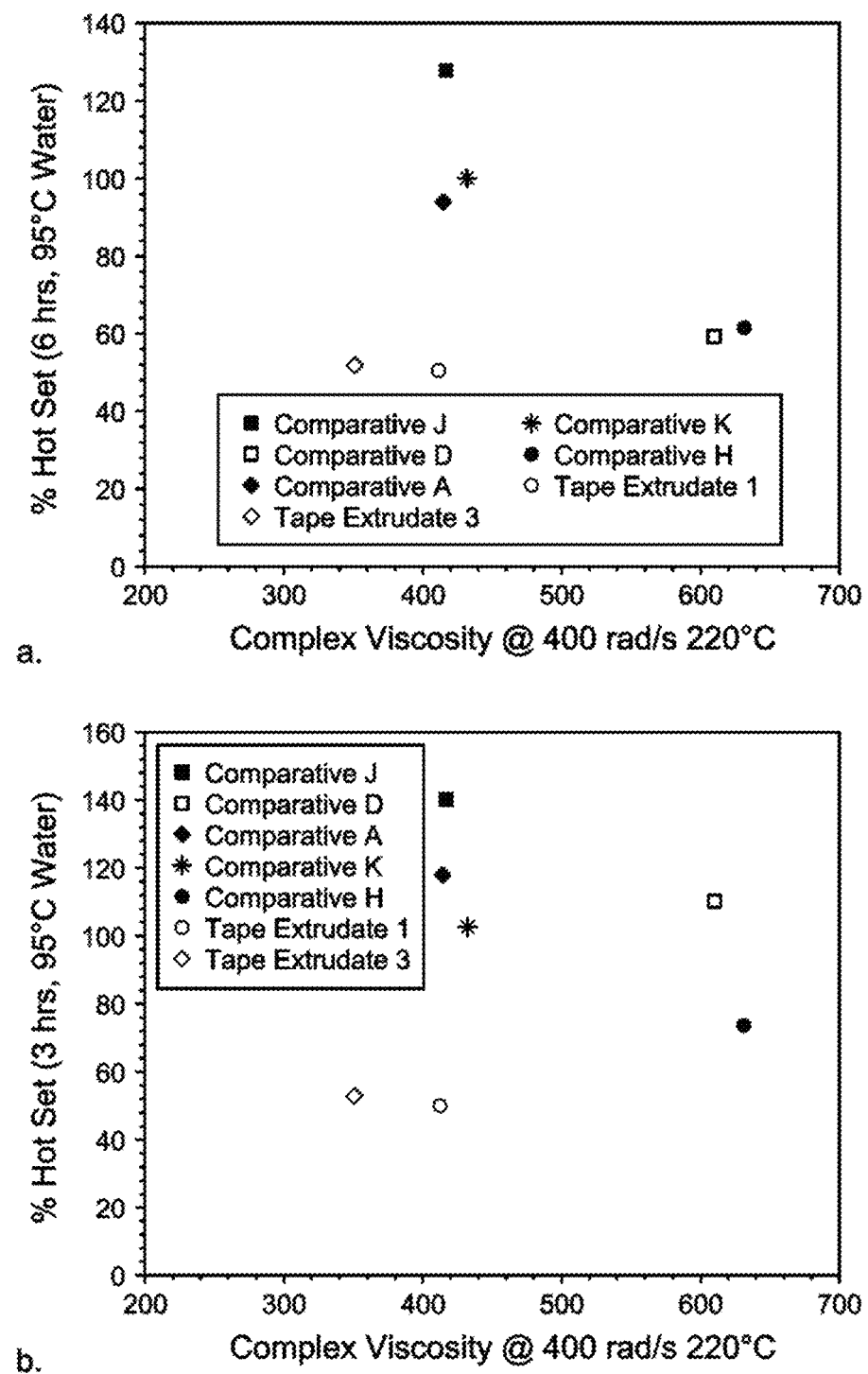
FIGS. 13a and 13b illustrates percentage (%) hot set time curing in water at 95° C. for 3 hours or 6 hours as a function of complex viscosity at 400 rad/s and 220° C. for dumbbell specimens cut out of Tape Extrudates 1-3 and Comparative Tape Extrudates A-K.

Percentage (%) hot set as a function of complex viscosity at 400 rad/s and 220° C. for tape extrudates in Table 4 is shown in FIGS. 13a and 13b for curing for 3 hours and 6 hours, respectively.

Example 4—Film Preparation and Film Blowing

Films 1-3 and Comparative Film A were prepared with the polyethylenes and according to the conditions provided in Table 5 below.

TABLE 5

Film Blowing Process Conditions

| | Film 1 | Film 2 | Film 3 | Comparative Film A |
|---|---|---|---|---|
| Polyethylene | Bimodal Polyethylene 1 | Bimodal Polyethylene 1 | Bimodal Polyethylene 1 | Enable 27-05HH |
| Die Gap (mil) | 30 | 30 | 30 | 30 |
| BUR | 2.5 | 2.5 | 2.5 | 2.5 |
| CHARACTERIZATION | | | | |
| MI ($I_2$) | 0.56 | 1.04 | 1.18 | 0.50 |
| HLMI ($I_{21}$) | 58.2 | 84.4 | 77.6 | |
| MIR ($I_{21}/I_2$) | 104 | 81 | 66 | |
| Density (g/cm³) | 0.928 | 0.9281 | 0.9251 | 0.927 |
| PROCESS CONDITIONS | | | | |
| Melt Temperature (° F.) | 391 | 390 | 391 | 405 |
| Output (lb/hr) | 190 | 188 | 189 | 189 |
| Head Pressure (psi) | 3240 | 2790 | 2760 | 4400 |
| Die Pressure (psi) | 2100 | 1690 | 1720 | 2990 |
| Motor Load (amps) | 58.8 | 53.1 | 56.4 | 80.3 |
| Screw Speed (rpm) | 75.8 | 73.8 | 70.7 | 66.2 |
| Line Speed (rpm) | 168 | 164 | 163 | 168 |
| Gauge (mils) | 0.99 | 1.05 | 1.04 | 0.98 |
| FLH (in) | 27 | 36 | 36 | 20 |

TABLE 5-continued

Film Blowing Process Conditions

|  | Film 1 | Film 2 | Film 3 | Comparative Film A |
|---|---|---|---|---|
| Air (%) | 81.7 | 68.5 | 69.5 | 82.3 |
| ESO (lb/hp-h) | 10.13 | 11.29 | 11.25 | 8.38 |
| Spec. Output (lb/h/rpm) | 2.51 | 2.53 | 2.67 | 2.85 |

Film Property Testing

The properties for Films 1-3 and Comparative Films A-C and were tested and are shown below in Tables 6 and 7, respectively.

TABLE 6

Properties of Films 1-3

| Property | Films | | |
|---|---|---|---|
| (Test Method) | 1 | 2 | 3 |
| Tensile Strength at Break (psi) (ASTM D882) | | | |
| MD | 6086 | 6973 | 6053 |
| TD | 5588 | 5445 | 5272 |
| Elongation at Break (%) (ASTM D882) | | | |
| MD | 386 | 474 | 421 |
| TD | 725 | 737 | 711 |
| Secant Modulus-1% Secant (psi) (ASTM D882) | | | |
| MD | 40525 | 42778 | 34850 |
| TD | 47688 | 51230 | 40420 |
| Dart Drop Impact (g) (ASTM D1709A) | 116 | 89 | 131 |
| Elmendorf Tear Strength (g) (ASTM D1922) | | | |
| MD | 50 | 49 | 120 |
| TD | 799 | 662 | 669 |
| Puncture Force (lbf) | 9.1 | 8.2 | 8.3 |
| Puncture Energy (in-lb) | 18 | 17 | 15 |
| Film Thickness (μm) | 27 | 28 | 29 |

TABLE 7

Properties of Comparative Films A-C

| Property | Comparative Films | | |
|---|---|---|---|
| (Test Method) | A | B | C |
| Tensile Strength at Break (psi) (ASTM D882) | | | |
| MD | 7777 | 8700 | 3700 |
| TD | 7112 | 6100 | 3200 |
| Elongation at Break (%) (ASTM D882) | | | |
| MD | 453 | 620 | 130 |
| TD | 733 | 910 | 540 |
| Secant Modulus-1% Secant (psi) (ASTM D882) | | | |
| MD | 44642 | 44000 | 34000 |
| TD | 51690 | 48000 | 42000 |
| Dart Drop Impact (g) (ASTM D1709A) | 133 | 70 | 160 |
| Elmendorf Tear Strength (g) (ASTM D1922) | | | |
| MD | 50 | 50 | 510 |
| TD | 666 | 450 | 140 |
| Puncture Force (lbf) | 11 | | 12 |
| Puncture Energy (in-lb) | 25 | | 7.6 |
| Film Thickness (μm) Properties | 26 | 30 | 51 |

Example 5—Film Preparation-Cast Films

Cast films were prepared from the following polyethylenes as shown in Table 8 below.

TABLE 8

Cast Films 1-6

| Cast Film | Polyethylene |
|---|---|
| 1 | Comparative PE 14 |
| 2 | Comparative PE 16 |
| 3 | Bimodal Polyethylene 3 |
| 4 | Bimodal Polyethylene 1 |
| 5 | Comparative PE 13 |
| 6 | Comparative PE 17 |

Figure 14:
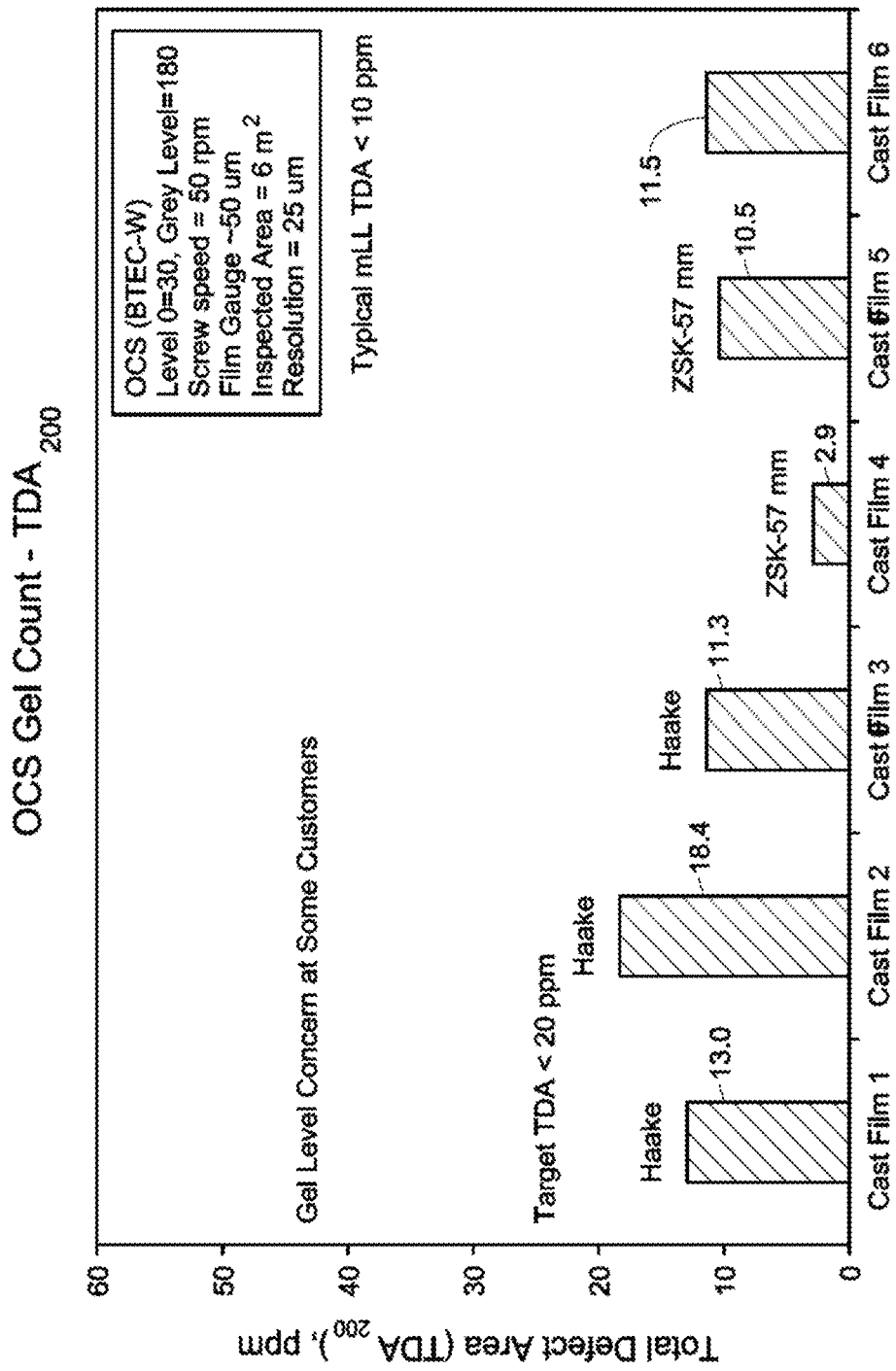
FIG. 14 illustrates gel count (total defect area of particles >200 µm) for the prepared Cast Films 1-6.

Gel count (total defect area of particles >200 μm) for Cast Films 1-6 was determined and the results are shown in FIG. 14. As shown in FIG. 14, films prepared from Bimodal Polyethylene had a surprisingly similar to lower gel count (≥200 μm particles) compared to Enable, Exceed and Exceed™ XP compositions (i.e., Cast Films 1, Cast Film 5, Cast Film 6).

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A polymer cable-coating and/or a wire-coating comprising a bimodal polyethylene comprising at least 80 mol % ethylene and at least one $C_3$-$C_{20}$ olefin comonomer; a high molecular weight portion having a weight average molecular weight ($M_w$) of 100,000 g/mol to 1,000,000 g/mol; and a low molecular weight portion having a $M_w$ of 10,000 g/mol to 80,000 g/mol, wherein the bimodal polyethylene has:
   (i) a density of 0.880 g/cm$^3$ to 0.960 g/cm$^3$;
   (ii) a melt index ($I_2$) of 0.10 g/10 min to 20 g/10 min;
   (iii) a melt index ratio ($I_{21}/I_2$) (MIR) of 40 to 200;

(iv) a shear thinning index (SHI*) (at 0.1 rad/s)≤0.70 or a SHI* (at 2.0 rad/s)≤0.30;
(v) a percentage hot set ≤80%; and
(vi) a $M_w$≤200,000 g/mol.

2. The polymer cable-coating and/or a wire-coating of claim 1, wherein the bimodal polyethylene has a molecular weight distribution ($M_w/M_n$) of 3 to 30.

3. The polymer cable-coating and/or a wire-coating of claim 1, wherein the bimodal polyethylene has one or more of the following:
(i) a density of 0.900 g/cm³ to 0.950 g/cm³;
(ii) a melt index ($I_2$) of 0.10 g/10 min to 10 g/10 min;
(iii) a melt index ratio ($I_{21}/I_2$) (MIR) of 60 to 200;
(iv) a shear thinning index (SHI*) (at 0.1 rad/s)≤0.60 or a SHI* (at 2.0 rad/s)≤0.20;
(v) a percentage hot set ≤70%
(vi) a high load melt index ($I_{21}$) of 45 g/10 min to 250 g/10 min;
(vii) a complex viscosity (measured at 400 rad/s and 220° C.)≤550 Pa. s; and
(viii) a shear viscosity (measured at a die wall shear rate of 7,000 s$^{-1}$ and 220° C.)≤70 Pa·s.

4. The polymer cable-coating and/or a wire-coating of claim 1, wherein:
at a molecular weight range of 10,000 to 500,000 g/mol, the bimodal polyethylene has an orthogonal comonomer distribution; and
at a molecular weight range of 500,000 to 2,000,000 g/mol the bimodal polyethylene has a comonomer distribution with decreasing comonomer content.

5. The polymer cable-coating and/or a wire-coating of claim 1, wherein the high molecular weight portion of the polyethylene bimodal is present in an amount of ≤50 wt % and the low molecular weight portion is present is an amount of ≥50 wt %, based on total weight of the bimodal polyethylene.

6. A method for preparing the polymer cable-coating and/or a wire-coating of claim 1 comprising:
contacting ethylene and at least one $C_3$-$C_{20}$ olefin comonomer with a mixed catalyst in a single reactor to produce the bimodal polyethylene: and
extruding the bimodal polyethylene at an apparent die wall shear rate ≥500 s$^{-1}$ and a melt temperature ≤250° C. to form the polymer cable-coating and/or wire-coating.

7. The method of claim 6, wherein the shear rate is ≥1000 s$^{-1}$ and/or the melt temperature is ≤220° C.

8. The method of claim 6, wherein the mixed catalyst comprises: (i) a metallocene catalyst and a non-metallocene catalyst; (ii) a metallocene catalyst and a single-site catalyst; (iii) a non-metallocene catalyst and a single-site catalyst; (iv) two metallocene catalysts; (v) two non-metallocene catalysts; or (vi) two single-site catalysts.

9. A polymer cable-coating and/or a wire-coating produced according to the method of claim 6.

10. A polymer film comprising a bimodal polyethylene comprising at least 80 mol % ethylene and at least one $C_3$-$C_{20}$ olefin comonomer; a high molecular weight portion having a weight average molecular weight ($M_w$) of 100,000 g/mol to 1,000,000 g/mol; and a low molecular weight portion having a $M_w$ of 10,000 g/mol to 80,000 g/mol; wherein the bimodal polyethylene has:
(i) a density of 0.880 g/cm³ to 0.940 g/cm³;
(ii) a melt index ($I_2$) of 0.10 g/10 min to 10 g/10 min; and
(iii) a melt index ratio ($I_{21}/I_2$) (MIR) of 40 to 200; and
(iv) a $M_w$≤200,000 g/mol;
and wherein the polymer film has:
(i) a 1% secant modulus (MD or TD) >32,000 psi; and
(ii) an Elmendorf Tear (MD or TD) of 40 g to 1000 g.

11. The polymer film of claim 10, wherein the bimodal polyethylene has a molecular weight distribution ($M_w/M_n$) of 3 to 30.

12. The polymer film of claim 10, wherein the bimodal polyethylene has one or more of:
(i) a density of 0.900 g/cm³ to 0.940 g/cm³;
(ii) a melt index ($I_2$) of 0.10 g/min to 5.0 g/min;
(iii) a melt index ratio ($I_{21}/I_2$) (MIR) of 60 to 200;
(iv) a melt strength of at least 4 cN;
(v) a melt elasticity (G') of ≥1000 Pa; and
(vi) a high load melt index ($I_{21}$) of 45 g/10 min to 150 g/10 min; and
wherein the polymer film has one or more of:
(i) a 1% secant modulus (MD or TD) ≥34,000 psi;
(ii) an Elmendorf Tear (MD or TD) of 45 g to 900 g;
(iii) a film gel count (>200 μm particles) <30 ppm;
(iv) a dart drop impact ≥70 g; and
(v) an elongation at break (MD or TD) ≥350%.

13. The polymer film of claim 10, wherein:
at a molecular weight range of 10,000 to 500,000 g/mol, the bimodal polyethylene has an orthogonal comonomer distribution; and
at a molecular weight range of 500,000 to 2,000,000 g/mol the bimodal polyethylene has a comonomer distribution with decreasing comonomer content.

14. The polymer film of claim 10, wherein the high molecular weight portion is present in an amount of ≤50 wt % and the low molecular weight portion is present is an amount of ≥50 wt %, based on total weight of the bimodal polyethylene composition.

15. A method for preparing the polymer film of claim 10 comprising:
contacting ethylene and at least one $C_3$-$C_{20}$ olefin comonomer with a mixed catalyst in a single reactor to produce the bimodal polyethylene; and
extruding the bimodal polyethylene at a die pressure ≤2900 psi and a motor load ≤70 amps to form the polymer film.

16. The method of claim 15, wherein the die pressure is ≤2500 psi and the motor load is ≤60 amps.

17. The method of claim 15, wherein the mixed catalyst comprises a metallocene catalyst and a non-metallocene catalyst.

18. A polymer film produced according to the method of claim 15.

* * * * *